United States Patent
Saito et al.

(10) Patent No.: US 10,410,667 B2
(45) Date of Patent: Sep. 10, 2019

(54) HIGH DENSITY OPTICAL DISK PROCESSING APPARATUS, METHOD, AND COMPUTER-READABLE MEDIUM

(71) Applicant: SONY CORPORATION, Tokyo (JP)

(72) Inventors: Kimihiro Saito, Saitama (JP); Toshihiro Horigome, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/766,696

(22) PCT Filed: Nov. 21, 2016

(86) PCT No.: PCT/JP2016/084407
§ 371 (c)(1),
(2) Date: Apr. 6, 2018

(87) PCT Pub. No.: WO2017/094541
PCT Pub. Date: Jun. 8, 2017

(65) Prior Publication Data
US 2018/0286454 A1 Oct. 4, 2018

(30) Foreign Application Priority Data

Dec. 2, 2015 (JP) .................................. 2015-235804

(51) Int. Cl.
*G11B 7/007* (2006.01)
*G11B 7/24073* (2013.01)
(Continued)

(52) U.S. Cl.
CPC .......... *G11B 7/00718* (2013.01); *G11B 7/005* (2013.01); *G11B 7/007* (2013.01);
(Continued)

(58) Field of Classification Search
None
See application file for complete search history.

(56) References Cited

U.S. PATENT DOCUMENTS 5,170,385 A * 12/1992 Senshu .............. G11B 7/00745
369/111
5,557,592 A * 9/1996 Kobayashi ........... G11B 7/0045
369/124.14
(Continued)

FOREIGN PATENT DOCUMENTS

JP H03-093058 A 4/1991
JP 2002050081 A * 2/2002 ........... G11B 7/0053
(Continued)

OTHER PUBLICATIONS

Nov. 14, 2018, European Search Report issued for related EP application No. 16870478.1.

*Primary Examiner* — Tan X Dinh
(74) *Attorney, Agent, or Firm* — Paratus Law Group, PLLC

(57) ABSTRACT

There are provided an optical disk from which high-density data is reproduced and a reproduction apparatus that reproduces data from such an optical disk having high-density data recorded thereon. A photo-detecting section has two split detectors A and B in the direction of tracks on the disk. A signal processing section generates a TPP (Tangential Push-pull) signal made of a differential signal derived from detection signals from the detectors A and B, and further generates a reproduced signal by extracting from the TPP signal a high-frequency component signal in a record signal recorded on the disk. The signal processing section reconstitutes a high-frequency component signal in the record signal recorded on the disk by frequency-shifting the TPP signal obtained as a readout signal from a superimposed signal having the carrier signal and the record signal superimposed with each other.

15 Claims, 23 Drawing Sheets

(51) Int. Cl.
  *G11B 20/10* (2006.01)
  *G11B 20/18* (2006.01)
  *G11B 7/005* (2006.01)

(52) U.S. Cl.
  CPC ........ *G11B 7/0052* (2013.01); *G11B 7/24073* (2013.01); *G11B 20/10* (2013.01); *G11B 20/10296* (2013.01); *G11B 20/18* (2013.01)

(56) References Cited

U.S. PATENT DOCUMENTS

| | | | | |
|---|---|---|---|---|
| 5,638,354 | A * | 6/1997 | Nakayama | G11B 7/00718 369/275.3 |
| 6,282,163 | B1 * | 8/2001 | Fujiwara | G11B 7/004 369/47.35 |
| 6,327,240 | B1 * | 12/2001 | Tobita | G11B 7/00718 369/275.4 |
| 2003/0147338 | A1 * | 8/2003 | Yoshikawa | G11B 7/00718 369/275.3 |
| 2005/0190678 | A1 * | 9/2005 | Ide | G11B 20/10009 369/59.22 |
| 2006/0092778 | A1 * | 5/2006 | Shibuya | G11B 7/0903 369/44.23 |
| 2006/0104173 | A1 * | 5/2006 | Shibuya | G11B 7/0912 369/44.37 |
| 2007/0104066 | A1 | 5/2007 | Abranovich et al. | |
| 2008/0068959 | A1 * | 3/2008 | Saito | G11B 7/0956 369/53.19 |
| 2008/0267025 | A1 * | 10/2008 | Vlutters | G11B 7/0956 369/47.1 |
| 2010/0046338 | A1 * | 2/2010 | Saito | G11B 7/0065 369/47.15 |
| 2010/0214897 | A1 | 8/2010 | Kurihara et al. | |
| 2011/0002218 | A1 | 1/2011 | Fery et al. | |
| 2012/0294131 | A1 * | 11/2012 | Nishi | G11B 7/0901 369/47.44 |

FOREIGN PATENT DOCUMENTS

| | | | | |
|---|---|---|---|---|
| JP | 2004227777 A | * | 8/2004 | |
| JP | 2005222597 A | * | 8/2005 | ........ G11B 20/10009 |

* cited by examiner

FIG.13

| INPUT DATA BITS | MODULATED DATA BITS | |
|---|---|---|
| 00000000 | 010100100100 | |
| 00001000 | 000100100100 | |
| 000000 | 010100000 | |
| 000001 | 010100100 | |
| 000010 | 000100000 | |
| 000011 | 000100100 | |
| 0001 | 000100 | |
| 0010 | 010000 | |
| 0011 | 010100 | |
| 01 | 010 | |
| 10 | 001 | |
| 11 | 000 | PRECEDING MODULATED BITS = xx1 |
| | 101 | PRECEDING MODULATED BITS = xx0 |

(A) DISK FORMED WITH STAGGERED PATTERN CARRIER GROOVES

HIGH DENSITY OPTICAL DISK
PROCESSING APPARATUS, METHOD, AND
COMPUTER-READABLE MEDIUM

CROSS REFERENCE TO PRIOR APPLICATION

This application is a National Stage Patent Application of PCT International Patent Application No. PCT/JP2016/084407 (filed on Nov. 21, 2016) under 35 U.S.C. § 371, which claims priority to Japanese Patent Application No. 2015-235804 (filed on Dec. 2, 2015), which are all hereby incorporated by reference in their entirety.

TECHNICAL FIELD

The present disclosure relates to an information processing apparatus, an optical disk, an information processing method, and a program. More particularly, the disclosure relates to an information processing apparatus, an optical disk, an information processing method, and a program for achieving recording and reproduction of high-density data.

BACKGROUND ART

Recording media (optical disks) such as DVDs (Digital Versatile Discs) and BDs (Blu-ray® Discs) are extensively used as optical disks (media) for recording diverse content including movies, pieces of music and the like.

Today's recording media such as BDs mostly record HD images, i.e., so-called Hi-vision-ready 2K images. As enhancement of image quality continues, those media having ultra-high definition images (UHD: Ultra High Definition images) recorded thereon are expected to multiply. It is to be noted that, for example, 4K and 8K high-definition images are typical of the ultra-high definition images (UHD images).

Because such high-definition image data contains huge amounts of information, the disks such as SDs are required to record information thereon with higher density than ever.

Performed on the optical disks such as BDs is the process of emitting a laser beam to the data-recording surface of the disk and analyzing reflected light therefrom to read the signal recorded on the disk.

However, this method of reproduction using an optical pickup is subject to resolution-level constraints stemming from diffraction of light, for example.

If it is assumed that λ stands for the wavelength of the laser beam and NA for the numerical aperture of the lenses constituting the optical pickup, then resolution limit, i.e., maximum reproducible period, is defined as λ/2 NA.

That is, if the interval between marks (pits) on the optical disk is set to be less than or equal to λ/2 NA, which is the resolution limit, then reproduction using the optical pickup is not feasible. It is to be noted that, for example, PTL 1 (JP 1991-93058A) describes existing techniques disclosing a high-density recording structure of disks.

CITATION LIST

Patent Literature

PTL 1
 JP 1991-93058A

SUMMARY

Technical Problem

The present disclosure has been made in view of the above circumstances among others, and provides as an object an information processing apparatus, an optical disk, as information processing method, and a program for achieving recording and reproduction of high-density data.

Solution to Problem

According to a first aspect of the present disclosure, there is provided an information processing apparatus including a photo-detecting section configured to receive reflected light from a disk, and a signal processing section configured to generate a reproduced signal by performing signal processing on a light reception signal from the photo-detecting section. The photo-detecting section has two split detectors A and B in a direction of tracks on the disk. The signal processing section generates a TPP (Tangential Push-pull) signal made of a differential signal derived from detection signals from the detectors A and B, and generates the reproduced signal by extracting, from the TPP signal through calculation, a high-frequency component signal in a record signal recorded on the disk.

According to a second aspect of the present disclosure, there is provided an optical disk having a record signal recorded on a carrier signal on a disk made of carrier grooves in a protruding and recessed pattern having a high frequency higher than or equal to a cut-off frequency. The reproduction apparatus is used to read a TPP (Tangential Push-pull) signal obtained by frequency-shifting a superimposed signal having the carrier signal and the record signal superimposed with each other, the reproduction apparatus being further used to extract a high-frequency component signal from the record signal recorded on the optical disk by performing an operation of frequency-shifting the TPP signal to a high-frequency component range in the record signal recorded on the optical disk.

According to a third aspect of the present disclosure, there is provided an information processing method for execution by an information processing apparatus. The information processing apparatus includes a photo-detecting section configured to receive reflected light from a disk, and a signal processing section configured to generate a reproduced signal by performing signal processing on a light reception signal from the photo-detecting section. The photo-detecting section has two split detectors A and B in a direction of tracks on the disk. The information processing method includes causing the signal processing section to generate a TPP (Tangential Push-pull) signal made of a differential signal derived from detection signals from the detectors A and B, and causing the signal processing section to generate the reproduced signal by extracting, from the TPP signal through calculation, a high-frequency component signal in a record signal recorded on the disk.

According to a fourth aspect of the present disclosure, there is provided a program for causing an information processing apparatus to perform information processing. The information processing apparatus includes a photo-detecting section configured to receive reflected light from a disk, and a signal processing section configured to generate a reproduced signal by performing signal processing on a light reception signal from the photo-detecting section. The photo-detecting section has two split detectors A and B in a direction of tracks on the disk. The program performing a procedure includes causing the signal processing section to generate a TPP (Tangential Push-pull) signal made of a differential signal derived from detection signals from the detectors A and B, and causing the signal processing section to generate the reproduced signal by extracting, from the TPP signal through calculation, a high-frequency component signal in a record signal recorded on the disk.

Incidentally, the program of the present disclosure may be offered in a computer-readable format using storage media or communication media to information processing apparatuses or computer systems capable of executing diverse program codes. When provided with such a program in a computer-readable manner, the information processing apparatus or the computer system performs the processes defined by the program.

Other objects, features and advantages of the present disclosure will become apparent upon reading of the following more detailed description of a preferred embodiment of the present disclosure with reference to the appended drawings. It is to be noted that, in this description, the term "system" refers to a group of logically configured devices. The devices in such a configuration may or may not be housed in a single enclosure.

Advantageous Effects of Invention

According to the structures of one embodiment of the present disclosure, there is provided an optical disk from which high-density data is reproduced, as well as a reproduction apparatus that reproduces data from such an optical disk having high-density data recorded thereon.

Specifically, a photo-detecting section having two split detectors A and B in the track direction of the disk and a signal processing section are provided. The signal processing section generates a TPP (Tangential Push-pull) signal as a differential signal derived from detection signals of the detectors A and B. Using the TPP signal, the signal processing section extracts by calculation a high-frequency component signal from a record signal recorded on the disk to generate a reproduced signal. The disk is structured to have the record signal recorded on a carrier signal over the disk formed with a protruding and recessed pattern of high frequencies higher than or equal to a cut-off frequency. The signal processing section multiplies by the carrier signal the TPP signal read from the disk as a frequency-shifted signal having the carrier signal and the record signal superimposed thereon. In so doing, the signal processing section shifts the TPP signal to frequencies in the high-frequency range to extract the high-frequency component signal from the record signal on the disk.

These structures are used to implement an optical disk from which high-density data is reproduced as well as a reproduction apparatus that reproduces data from an optical disk having high-density data recorded thereon.

It is to be noted that the advantageous effects mentioned in this description are only examples and not limitative of the present disclosure. Further advantages may become apparent from a reading of the present disclosure.

BRIEF DESCRIPTION OF DRAWINGS

FIG. 13 is an explanatory diagram explaining a typical process of modulating data from 2 bits to 3 bits according to the (1, 7) RLL run length rules.

DESCRIPTION OF EMBODIMENT

Figure 1:
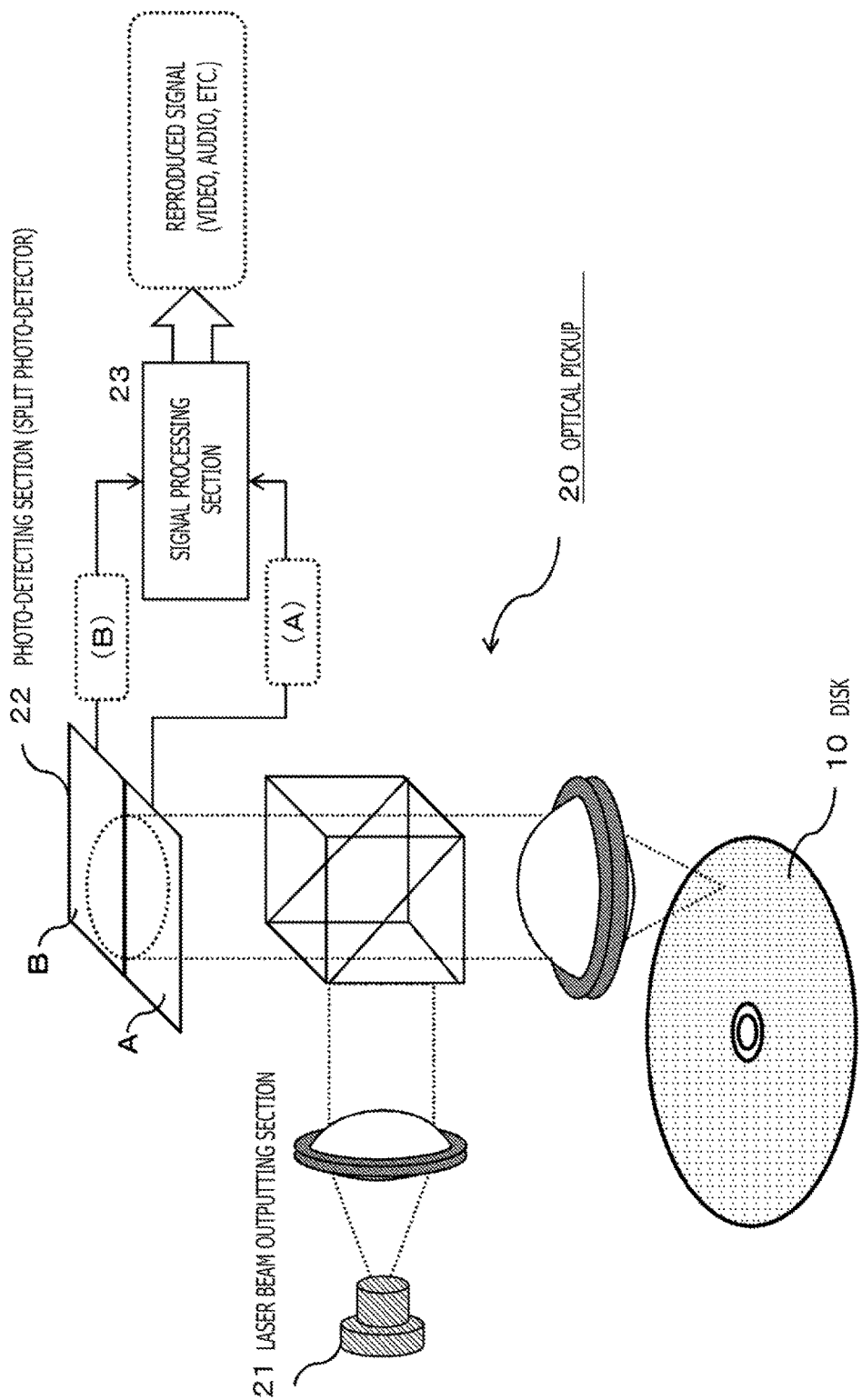
FIG. 1 is an explanatory diagram explaining a structure of a data reproduction process for reproducing data from a disk.

An information processing apparatus, an optical disk, an information processing method, and a program according to the present disclosure are described below in detail with reference to the accompanying drawings. It is to be noted that the description will be given under the following headings:

1. Typical processes of reproducing data from the optical disk

2. Structures for achieving recording and reproduction of high-density data

3. Explanation of the principle of reproducing high-frequency signals with frequencies higher than the cut-off frequency (Fc)

4. Typical simulation of the process of reproducing data from the disk having M-sequence random data recorded thereon 5. Typical simulation of the process of reproducing data from the disk having (1, 7) RLL data recorded thereon.

6. Other typical reproduction circuit configurations

7. Summary of the structures according to the present disclosure

1. Typical Processes of Reproducing Data from the Optical Disk

Described first is a typical process of reproducing data recorded on an optical disk such as a BD (Blu-ray® Disc).

FIG. 1 depicts a typical structure of a data reproduction process for reading and reproducing data from an optical disk 10 that is an optical disk such as BD.

The disk 10 has mark (pit) arrays of data recorded thereon. An optical pickup 20 reads the mark arrays.

The optical pickup 20 includes a laser beam outputting section 21. The laser beam output by the laser beam outputting section 21 is emitted to the disk through a setting light path made up of multiple lenses, for example. Reflected light from the disk 10 is further received by a photo-detecting section (split photo-detector) 22.

The photo-detecting section (split photo-detector) 22 includes multiple split detectors. Each of the detectors outputs to a signal processing section 23 an electrical signal reflecting the amount of light received.

In the example depicted in the drawing, the photo-detecting section (split photo-detector) 22 is split into two detectors A and B. The signal processing section 23 receives input of two electrical signals (A) and (B) reflecting the amounts of light received by the two detectors A and B.

The signal processing section 23 performs the process of binarizing a reproduced signal using the electrical signals (A) and (B) input from the photo-detecting section (split photo-detector) 22. That is, the signal processing section 23 generates 1/0 signals reflecting the mark arrays recorded on the disk 10 and outputs the generated signals as the reproduced signal.

For example, the signal processing section 23 has the functions of performing the process of A/D conversion of the input signal from the photo-detecting section. (split photo-detector) 22, the process of generating a clock signal using a PLL (Phase Lock Loop), and a maximum likelihood decoding process based on the method of PRML (Partial Response Maximum Likelihood), for example. Using these processing functions, the signal processing section 23 generates 1/0 signals reflecting the mark arrays recorded on the disk 10 and outputs the generated signals as the reproduced signal.

The disk 10 has, for example, 4K or 8K high-resolution images recorded thereon as ultra-high definition images (UHD: Ultra High Definition images).

Such high-definition image data contains large quantities of information. The disks such as BDs are required to record such data with higher density than ever.

The disk 10 comes in two types with different densities of mark (pit) arrays: a low-density recording disk with a small amount of recorded data, and a high-density recording disk with a large amount of recorded data.

Figure 2:
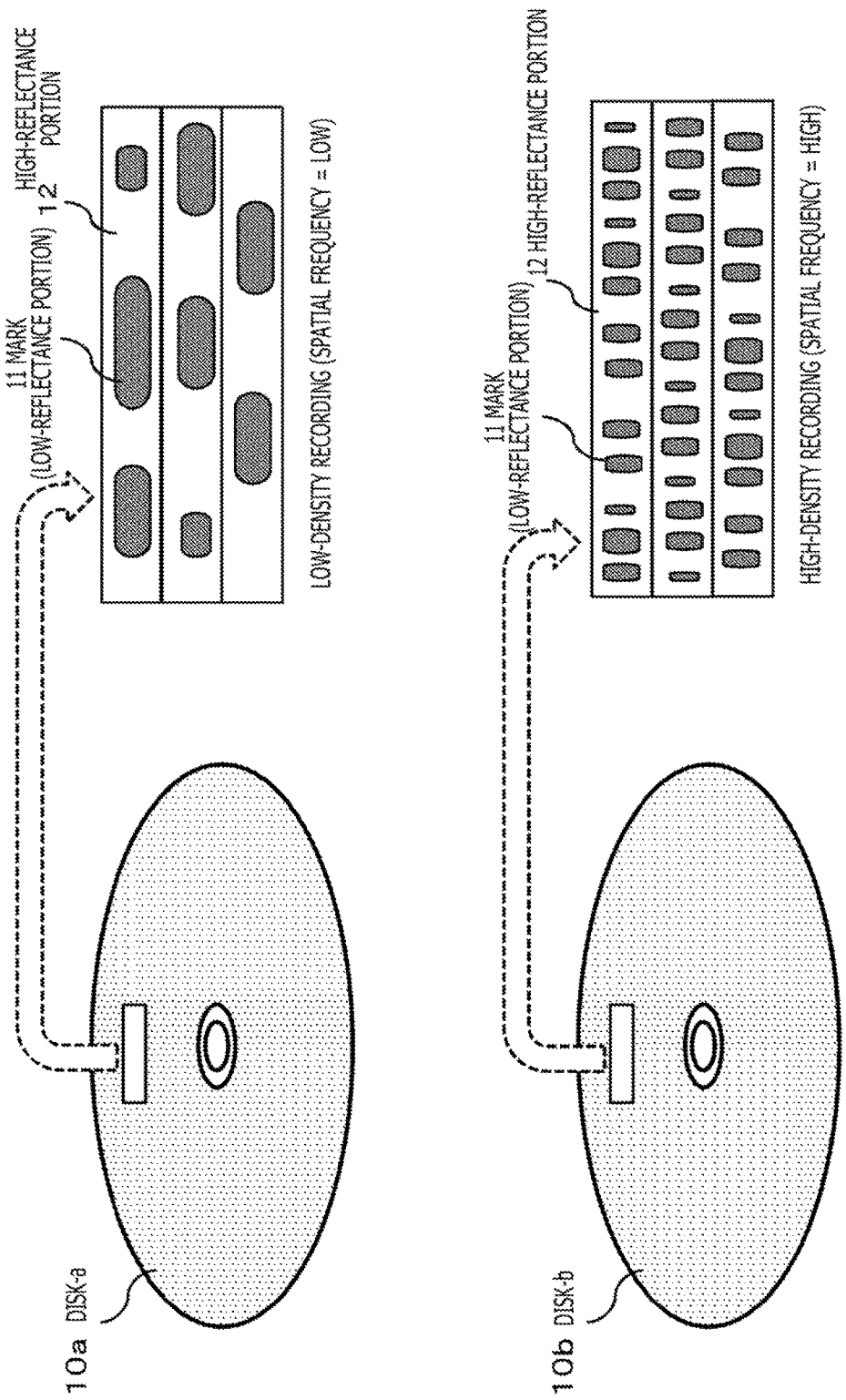
FIG. 2 is an explanatory diagram explaining typical data recording structures for recording data to the disk.

FIG. 2 schematically depicts typical mark arrays on disks with different data recording densities.

A disk-a 10a is a low-density recording disk that has marks (low-reflectance portions) 11 formed along with high-reflectance portions 12 other than the marked portions, the two types of portions being alternated at relatively long intervals.

This is an example of recorded data with a low so-called spatial frequency.

On the other hand, a disk-b 10b is a high-density recording disk that has numerous marks (low-reflectance portions) 11 arrayed at short intervals with high density in the high-reflectance portions 12 other than the marked portions. This is an example of recorded data with a high spatial frequency.

As described above with reference to FIG. 1, what is performed on the optical disk such as BD is the process of emitting a laser beam to the data-recording surface and analyzing reflected light therefrom to read the signal from the disk.

However, this method of reproduction using the optical pickup is subject to resolution-level constraints stemming from diffraction of light, for example.

If it is assumed that $\lambda$ stands for the wavelength of the laser beam and NA for numerical aperture of the lenses constituting the optical pickup, then resolution limit frequency is defined as $2\ NA/\lambda$.

One problem here is that if the mark period on the optical disk is set for a density higher than or equal to frequencies lower than or equal to $\lambda/2\ NA$ constituting the resolution limit, then reproduction with the optical pickup is not feasible.

Figure 3:
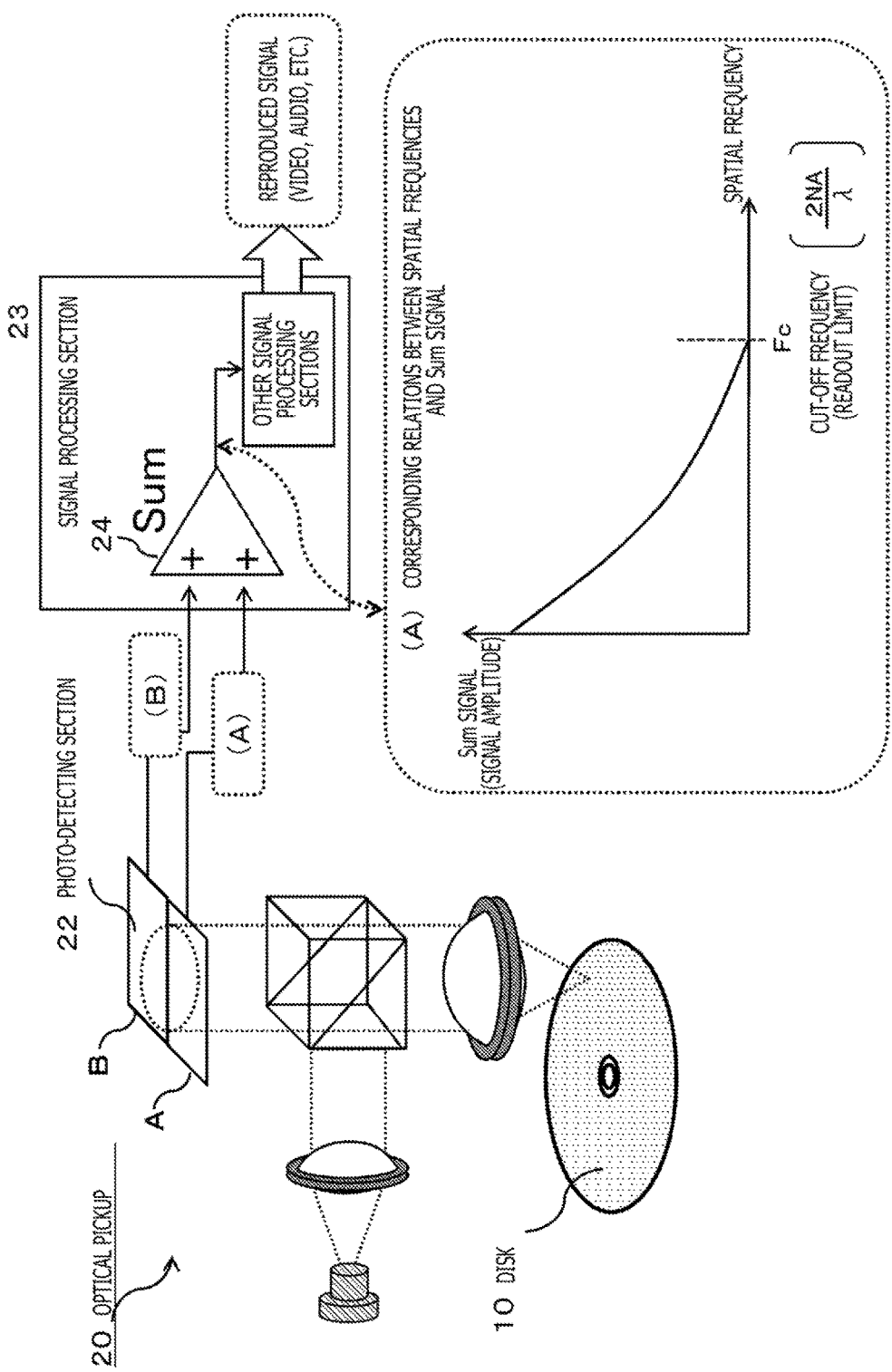
FIG. 3 is an explanatory diagram explaining the data reproduction processing structure for reproducing data from the disk, and a cut-off frequency constituting a readout limit.

FIG. 3 is an explanatory diagram explaining the resolution limit.

The example depicted in FIG. 3 is a typical structure for generating a reproduced signal made up of 1 and 0 signals reflecting the mark arrays on the basis of a sum signal A+B generated by a sum signal generating section (Sum) 24 that sums up the electrical signals and (B) formed in the signal processing section 23 from the photo-detecting section. 22 having the two split detectors (A, B) described above with reference to FIG. 1.

However, the output (signal amplitude) of the sum signal generating section (Sum) 24 formed in the signal processing section 23 varies depending on the spatial frequency of the data recorded on the disk 10, as depicted in Subfigure in FIG. 3, "Corresponding relations between spatial frequencies and sum signal."

That is, the higher the spatial frequency, i.e., the higher the data recording density on the disk, the smaller the output (signal amplitude) of the sum signal generating section (Sum) 24 becomes.

If the spatial frequency is higher than the frequency Fc indicated in the graph, the signal amplitude becomes 0. That means it is impossible to distinguish the data recorded on the disk having a recording density with a spatial frequency higher than or equal to the frequency Fc.

The spatial frequency Fc, which is the readout limit, is the resolution limit frequency defined as $Fc=2\ NA/\lambda$, where $\lambda$ stands for the wavelength of the laser beam from the optical pickup 20 and NA for the numerical aperture of the lenses constituting the optical pickup.

Incidentally, the spatial frequency that is the readout limit is known as the cut-off frequency.

In practice, in the data recorded on the disk 10, there exist signals of diverse frequency components ranging from low to high frequencies.

Figure 4:
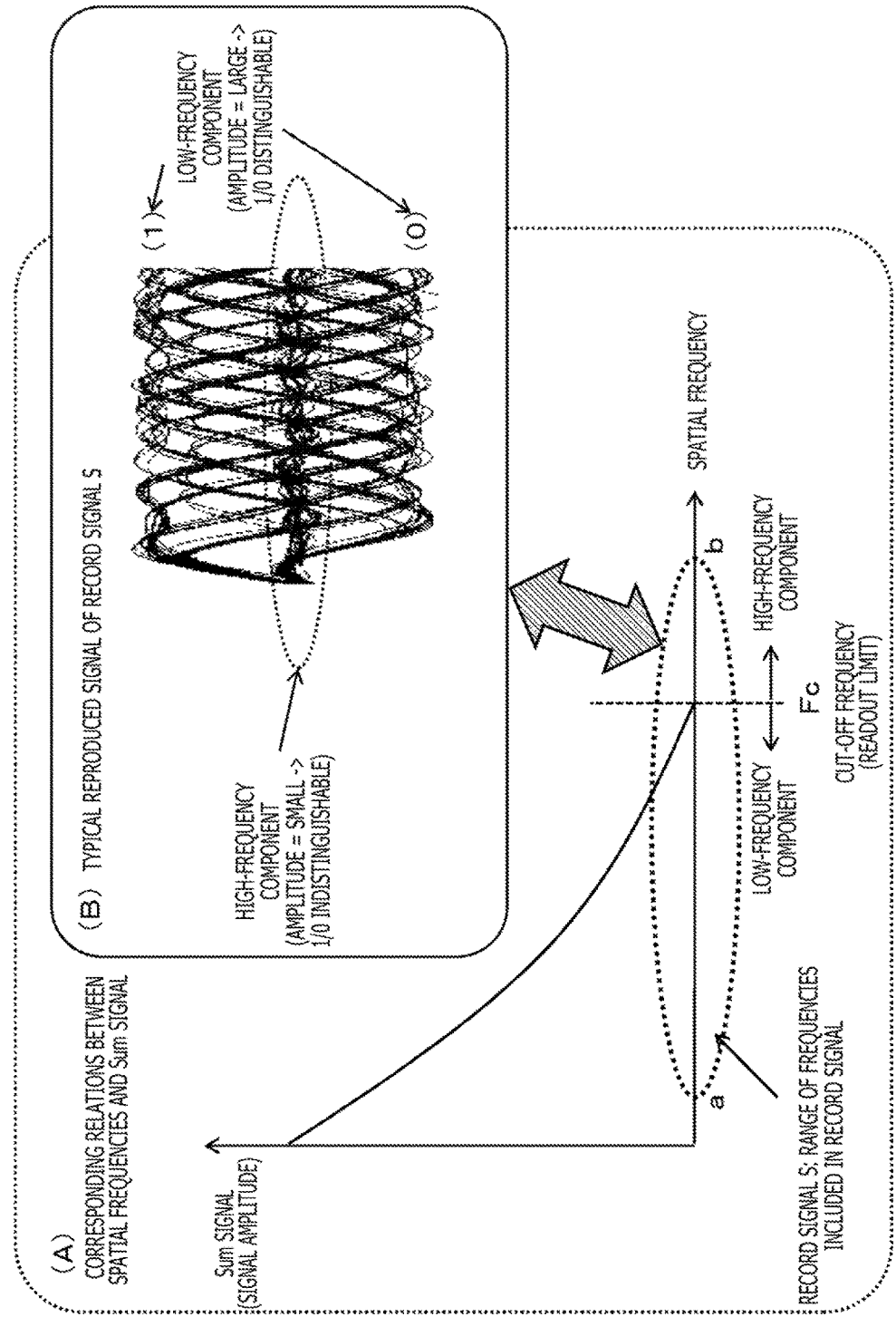
FIG. 4 is an explanatory diagram explaining a typical reproduced signal applicable in a case where recorded data including frequency components exceeding the cut-off frequency is reproduced from the disk.

Explained below with reference to FIG. 4 is a specific example in which the reproduced signal is generated from such a mixed component signal that is read using the optical pickup.

The graph in Subfigure (A) in FIG. 4 is the same as Subfigure (A) in FIG. 3, "Corresponding relations between spatial frequencies and sum signal."

It is assumed that a region S depicted in the graph represents the distribution of spatial frequencies included in the signal recorded on the disk 10. That it, the disk 10 is assumed to store data of the frequency components ranging from a spatial frequency a to a spatial frequency b.

The frequency a is lower than the cut-off frequency Fc. The frequency b is a high-frequency component higher than the cut-off frequency Fc.

A typical reproduced signal derived from the record signal S has the waveform depicted in Subfigure (B) in FIG. 4.

The signal of the low-frequency component lower than the cut-off frequency Fc is divided into the upper and lower portions of the waveform. That is, this signal is reproduced as 1 or 0 signal values.

On the other hand, the signal of the high-frequency component higher than the cut-off frequency Fc is not divided into the upper and lower portions of the waveform. This signal is concentrated on a center portion, i.e., on a boundary region between 0s and 1s. As a result, the signal cannot be reproduced as 1 or 0 signal values.

As described above, the method of reproduction using the optical pick is under resolution-level constraints stemming from diffraction of light, for example. If it is assumed that λ stands for the wavelength of the laser beam and NA for the numerical aperture of the lenses constituting the optical pickup, then resolution limit frequency is defined as 2 N/λ.

It is impossible to reproduce high-frequency signals exceeding the resolution limit. This has been an impediment to increasing the data recording density of the disk.

2. Structures for Achieving Recording and Reproduction of High-Density Data

Described below are the structures for achieving recording and reproduction of high-density data.

Figure 5:
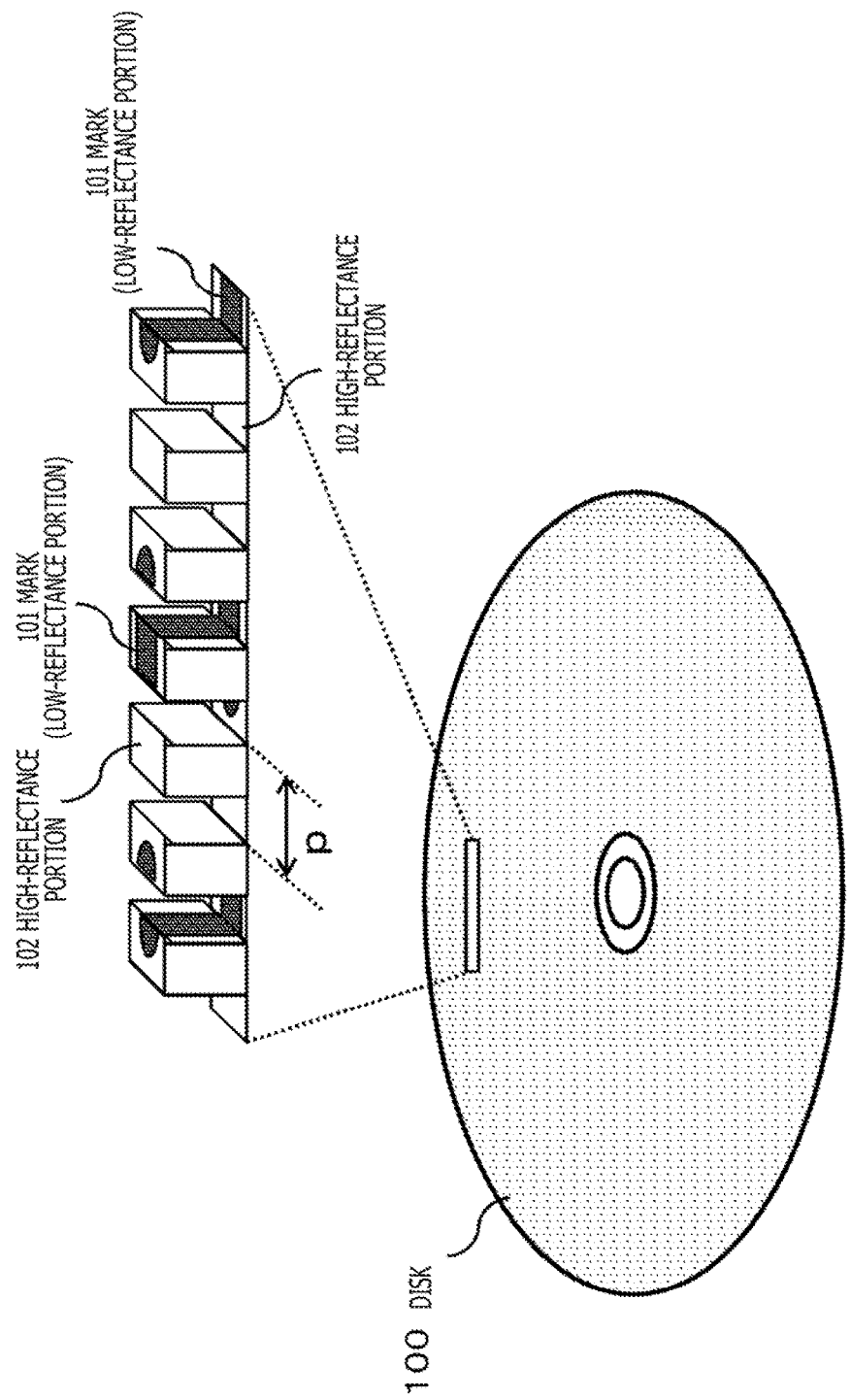
FIG. 5 is an explanatory diagram explaining a typical disk structure according to one embodiment of the present disclosure.

FIG. 5 depicts an example of a high-density recording disk 100 according to the present disclosure.

A protruding and recessed pattern that is regularly periodic in the direction of tracks is formed on the disk 100.

On this regularly periodic protruding and recessed pattern, marks (pit arrays) corresponding to the record signal making up content data such as movies are recorded.

The regularly periodic protruding and recessed pattern is formed in advance on the disk, and has a period p as illustrated.

The frequency specific to the protruding and recessed pattern having the period p is higher than the cut-off frequency Fc explained above with reference to FIGS. 3 and 4. This is a frequency that exceeds the readout limit of the optical pick 20.

That is, given the signal read by the optical pickup 20, it is impossible to directly identify the protruding and recessed pattern with the period p formed on the disk 100.

As depicted in FIG. 5, the record signal corresponding to content such as moves on the disk 100 is recorded by forming marks 101 over the protruding and recessed pattern having the period p.

It is to be noted that the marks 101 are formed, for example, by emitting a laser beam to a phase-change recording layer prepared on the reflecting surface. The marks 101 constitute the low-reflectance portions, and the unmarked portions are set to make up high-reflectance portions 102. The marked portions (low-reflectance portions) correspond to 1 signals and the high-reflectance portions 102 correspond to 0 signals, or vice versa.

It is to be noted that a mark signal corresponding to the recorded data also includes a high-frequency component. This is a frequency component higher than the cut-off frequency Fc explained above with reference to FIGS. 3 and 4. That is, the mark signal includes a high-frequency component that exceeds the readout limit of the optical pickup 20.

As described above, the disk 100 according to the present disclosure has the following structures:

(a) a protruding and recessed pattern (carrier) recorded in the track direction with frequencies higher than the cut-off frequency Fc; and (b) a record signal made up of mark arrays recorded on the protruding and recessed pattern (carrier).

It is to be noted that the structure, "(a) Protruding and recessed pattern (carrier) recorded in the track direction with frequencies higher than the cut-off frequency Fc," is a signal recorded in advance on the disk. This signal is called "carrier," "carrier signal," or "carrier grooves."

The mark arrays corresponding to the record signal of the data making up content such as movies is recorded on the "carrier."

The carrier has frequencies higher than the cut-off frequency Fc. The record signal (mark arrays) also includes a high-frequency component higher than the cut-off frequency Fc.

Figure 6:
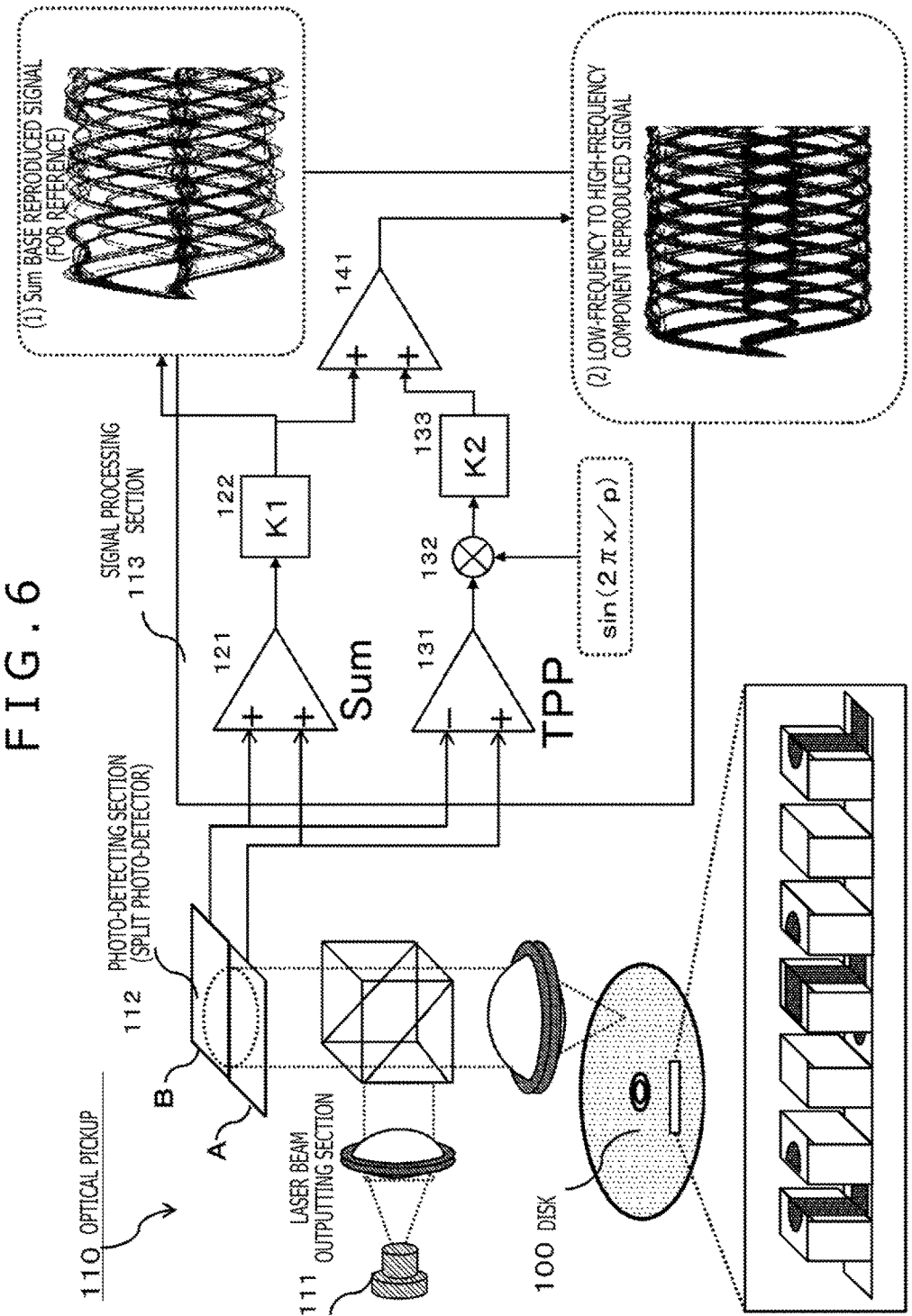
FIG. 6 is an explanatory diagram explaining a typical process of reproducing data from the disk.

Explained below with reference to FIG. 6 is an overview of the process of reproduction from the disk 100 described above with reference to FIG. 5.

The disk 100 depicted in FIG. 6 has the following structures as discussed above with reference to FIG. 5:

(a) a carrier (protruding and recessed pattern) recorded is the track direction with frequencies higher than the cut-off frequency Fc; and (b) a record signal made up of mark arrays recorded on the carrier.

The record signal on the disk 100 is read by an optical pickup 110.

The optical pickup 110 has the structure similarly to that of the optical pickup 20 described above with reference to FIG. 1.

That is, the optical pickup 110 includes a laser beam outputting section 111. A laser beam output from the laser beam outputting section 111 is emitted to the disk through multiple lenses, for example. Reflected light from the disk 100 further reaches a photo-detecting section (split photo-detector) 112.

The photo-detecting section (split photo-detector) 112 has multiple split detectors. Each of the detectors outputs to a signal processing section 113 an electrical signal reflecting the amount of light received.

The photo-detecting section (split photo-detector) 112 is split into two detectors A and B. The signal processing section 113 receives input of two electrical signals (A) and (B) reflecting the amounts of light received by the two detectors A and B.

The signal processing section 113 performs the process of binarizing a reproduced signal using the electrical signals (A) and (B) input from the photo-detecting section (split photo-detector) 112. That is, the signal processing section 113 generates 1/0 signals reflecting the mark arrays recorded on the disk 100, and outputs the generated signals as the reproduced signal.

As depicted in FIG. 6, the signal processing section 113 includes two sections:

a sum signal generating section (Sum) 121 that generates a sum signal (A+B) summing up the electrical signals (A) and (B) from the two split detectors (A, B) of the photo-detecting section 112; and a differential signal generating section (TPP) 131 that generates a differential signal (A−B) based on the electrical signals (A) and (B) from the two split detectors (A, B) of the photo-detecting section 112.

The electrical signals (A) and (B) from the two split detectors (A, B) of the photo-detecting section 112 are input to the sum signal generating section (Sum) 121 and to the differential signal generating section (TPP) 131.

It is to be noted that the differential signal generating section (TPP) 131 generates a push-pull signal using the two electrical signals (A) and (B) from the photo-detecting section 112 with the two split detectors (A, B) arrayed in the track direction (tangential direction) on the disk 11. That is, the output of the differential signal generating section (TPP) 131 is a tangential push-pull signal (TPP: Tangential Push-pull) based on the electrical signals (A) and (B).

In the description that follows, the output of the sum signal generating section (Sum) 121 will be referred to as "sum signal" or "addition signal," and the output of the differential signal generating section (TPP) 131 as "TPP signal" or "differential signal."

The sum signal, which is output from the sum signal generating section (Sum) 121, is input to a gain controlling section (K1) 122 as well as to a composite signal generating section 141. The gain controlling section (K1) may be configured as a filter here.

A reference example depicted as "(1) Sum base reproduced signal (for reference)" in FIG. 6 is similar signal to the reproduced signal explained above with reference to Subfigure (B) in FIG. 4.

That is, the sum base reproduced signal is a signal with a low-frequency component lower than the cut-off frequency Fc and is divided into the upper and lower portions of the waveform. That is, this signal is reproduced as 1 or 0 signal values.

On the other hand, a signal with a high-frequency component higher than the cut-off frequency Fc is not divided into the upper and lower portions of the waveform. Such a signal is concentrated on the center portion, i.e., the boundary region between 0s and 1s. As a result, the signal cannot be reproduced as 1 or 0 signal values.

With the structures of the present disclosure, the sum base reproduced signal is not used as the reproduced signal. Instead, the output of the composite signal generating section 141 depicted in FIG. 6, i.e., a reproduced signal depicted in Subfigure (2) in FIG. 6 (low-frequency to high-frequency component reproduced signal), is generated and used as the reproduced signal.

The TPP signal, which is output from the differential signal generating section (TPP) 131 depicted in FIG. 6, is multiplied with a separately generated carrier signal by a multiplier 132.

The carrier signal on the disk, as explained above with reference to FIG. 5, is a signal based on the protruding and recessed pattern with the period p formed beforehand on the disk 100. This signal corresponds to a sine wave defined as $[\operatorname{Sin}(2\pi x/p)]$. It is to be noted that the symbol x indicates a position in the track direction of the disk.

The TPP signal, which is output from the differential signal generating section (TPP) 131, is a so-called moire signal having the following two different signals superimposed thereon:

(a) a carrier (protruding and recessed pattern) recorded in the track direction with frequencies higher than the cut-off frequency Fc; and (b) a record signal made up of mark arrays recorded on the carrier.

Because the carrier signal on the disk is a protruding and recessed pattern making up a phase component and because the marks constitute changes in reflectance with no phase, the moire signal is generated as the phase component by the multiplication. The TPP signal reproduces the phase component.

The TPP signal as the superimposed signal is multiplied with the separately-generated carrier signal $[\operatorname{Sin}(2\pi x/p)]$. This operation involves frequency-shifting the TPP signal read from the disk as a frequency-shifted readout signal (moire signal) having the carrier signal and the record signal superimposed thereon, to the high-frequency component signal in the record signal on the disk for signal component extraction.

That is, the output of the multiplier 132 is the record signal component extracted by frequency-shifting the TPP signal to the high-frequency component in the record signal recorded on the disk, the TPP signal having been obtained as a frequency-shifted readout signal (moire signal) having the carrier signal on the disk and the record signal superimposed thereon. The output of the multiplier 132 is input to a gain controlling section (K2) 133, before being input to a sum signal generating section 118. The gain controlling section (K2) may be configured as a filter here.

The composite signal generating section 141 performs the process of combining two signals: the sum base reproduced signal explained above with reference to Subfigure (1) in FIG. 6, and a TPP base signal based on the output of the multiplier 132 having removed the carrier signal component of the disk from the TPP signal.

The output of the composite signal generating section 141 is the reproduced signal. (low-frequency to high-frequency component reproduced signal) depicted in Subfigure (2) in FIG. 6.

The reproduced signal depicted in Subfigure (2) in FIG. 6 is a composite signal combining the following two signals:

(a) the sum base reproduced signal representing the low-frequency component which is included in the record signal and which is lower than or equal to the cut-off frequency (Fc); and (b) the TPP base reproduced signal representing the high-frequency component which is included in the record signal and which is higher than or equal to the cut-off frequency (Fc).

The reproduced signal indicated in Subfigure (2) in FIG. 6 is a composite signal combining the above two signals.

It is to be noted that the sum base reproduced signal is obtained through the sum signal generating section (Sum) 121 and the gain controlling section. (K1) 122.

In addition, the TPP base reproduced signal is obtained through the differential signal generating section (TPP) 131, the multiplier 132, and the gain controlling section (K2) 133.

The TPP signal having the following two signals superimposed thereon is obtained as a readout signal frequency-shifted to low frequencies:

(a) the carrier (protruding and recessed pattern) which is recorded in the track direction and which has frequencies higher than the cut-off frequency Fc; and (b) the record signal made up of mark arrays recorded on the carrier.

The TPP base reproduced signal is then extracted by frequency-shifting the TPP signal to the high-frequency component in the record signal recorded on the disk.

The moire signal often occurs at low frequencies in a range where the carrier signal on the disk with frequencies higher than the cut-off frequency (Fc) over the entire range and the high-frequency portion in the record signal with frequencies higher than the cut-off frequency (Fc) are superimposed on each other.

That is, a distinct moire signal is not much generated from the low-frequency portion in the record signal with frequencies lower than the cut-off frequency (Fc). From the TPP base reproduced signal, a high-frequency signal in the record signal is mainly extracted.

Thus the composite signal generating section 141 combines the high-frequency range signal in the record signal obtained from the TPP base reproduced signal, with the low-frequency range signal in the record signal acquired from the sum base reproduced signal, the low-frequency range signal having frequencies lower than the cut-off frequency (Fc). In so doing, the composite signal generating section 141 acquires a reproduced signal with a wide frequency band ranging from the low to high frequencies in the record signal, as depicted in Subfigure (2) in FIG. 6.

Figure 7:
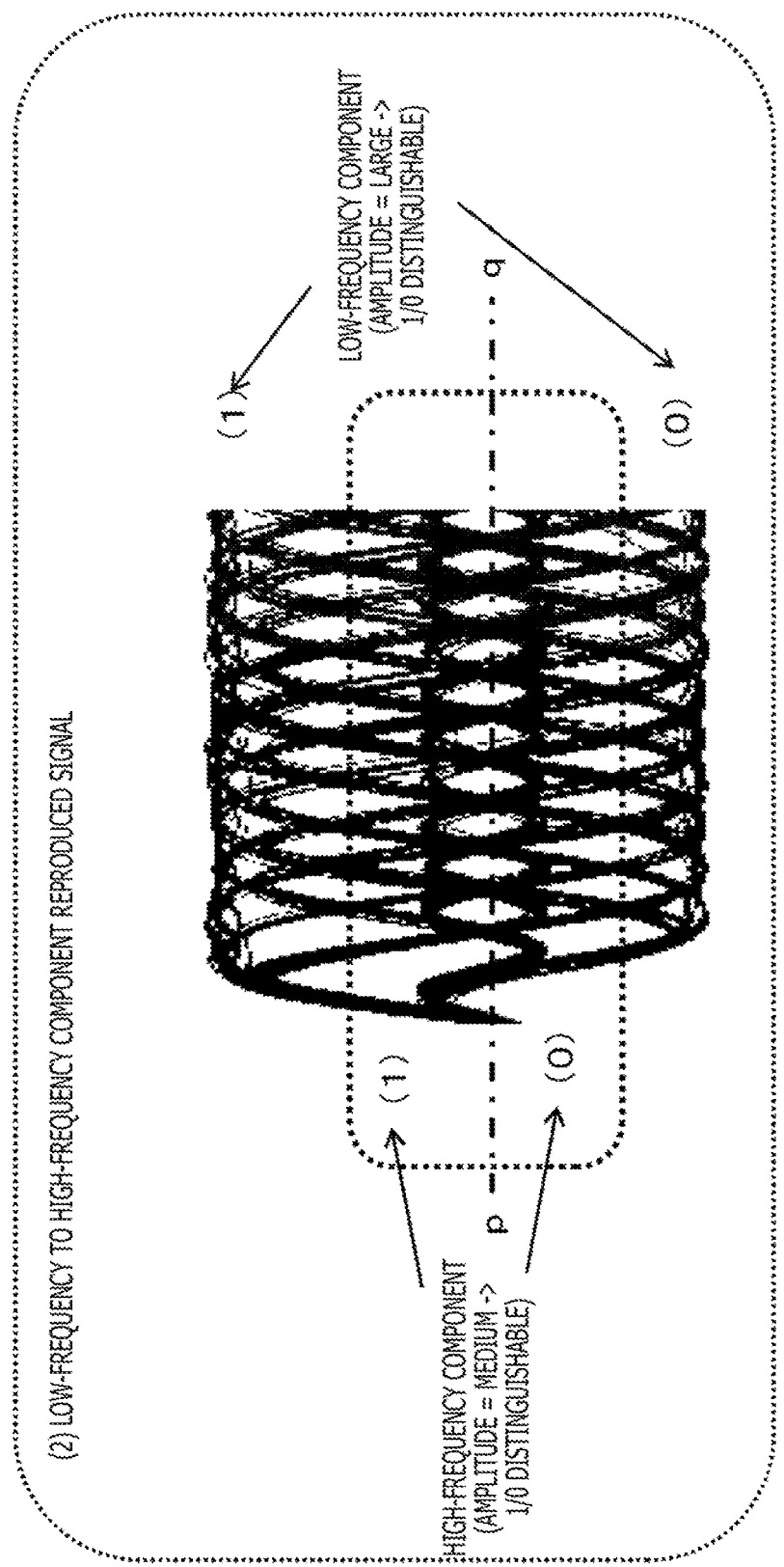
FIG. 7 is an explanatory diagram explaining a typical reproduced signal.

Explained below with reference to FIG. 7 are details of the reproduced signal depicted in Subfigure (2) in FIG. 6, i.e., the reproduced signal with a wide frequency band ranging from low frequencies lower than or equal to the cut-off frequency (Fc) to high frequencies higher than or equal to the cut-off frequency (Fc).

The data recorded on the disk 100 includes mixed frequency component signals ranging from low-frequency signal to high-frequency signal.

FIG. 7 depicts a typical reproduced signal that is read using the optical pickup 110 depicted in FIG. 6 and obtained as a result of the processing by the signal processing section 113.

The frequency component lower than the cut-off frequency Fc is divided into the upper and lower portions of a signal pattern waveform depicted in FIG. 7. That is, the low-frequency component is reproduced as 1 or 0 signal values.

The low-frequency component is a reproduced signal obtained from the sum base reproduced signal. That is, this is a signal acquired through the sum signal generating section (Sum) 121 and the gain controlling section (K1) 122.

On the other hand, the frequency component higher than the cut-off frequency Fc is divided into the upper and lower portions in a center region of the signal pattern waveform depicted in FIG. 7. In this region, the signal is also divided distinctly into the upper and lower portions around a center line p-q. That is, the high-frequency component is reproduced as 1 or 0 signal values.

In the case of the reproduced signal generated on the basis of only the sum signal explained above with reference to Subfigure (B) in FIG. 4, for example, the high-frequency component is concentrated on the center portion of the waveform and is not divided into the upper and lower portions. In the signal pattern depicted in FIG. 7, by contrast, the high-frequency component is divided into the upper and lower portions around the center line p-q, so that the reproduced signal made up of 1s and 0s is obtained.

This high-frequency component is the reproduced signal obtained from the TPP base reproduced signal. That is, this is a signal acquired through the differential signal generating section (TPP) 131, the multiplier 132, and the gain controlling section (K2) 132.

As described above, according to the structures of the present disclosure, the signal obtained by the photo-detecting section 112 split into two detectors is used to acquire the sum base reproduced signal and the TPP base reproduced signal. On the basis or these signals, the reproduced signal is obtained as a signal with a wider frequency range ranging from low frequencies lower than the cut-off frequency (Fc) to high frequencies higher than the cut-off frequency (Fc).

It is to be noted that the TPP base reproduced signal is obtained by removing the carrier signal component from the superimposed signal (moire signal) including:

(a) the carrier (protruding and recessed pattern) recorded in the track direction with frequencies higher than the cut-off frequency Fc; and (b) the record signal made up of mark arrays recorded on the carrier.

As such, the TPP base reproduced signal corresponds to the high-frequency range signal in the record signal.

3. Explanation of the Principle of Reproducing High-frequency Signals with Frequencies Higher than the Cut-off Frequency (Fc).

Explained below is the principle of reproducing high-frequency signals with frequencies higher than the cut-off frequency (Fc).

Figure 8:
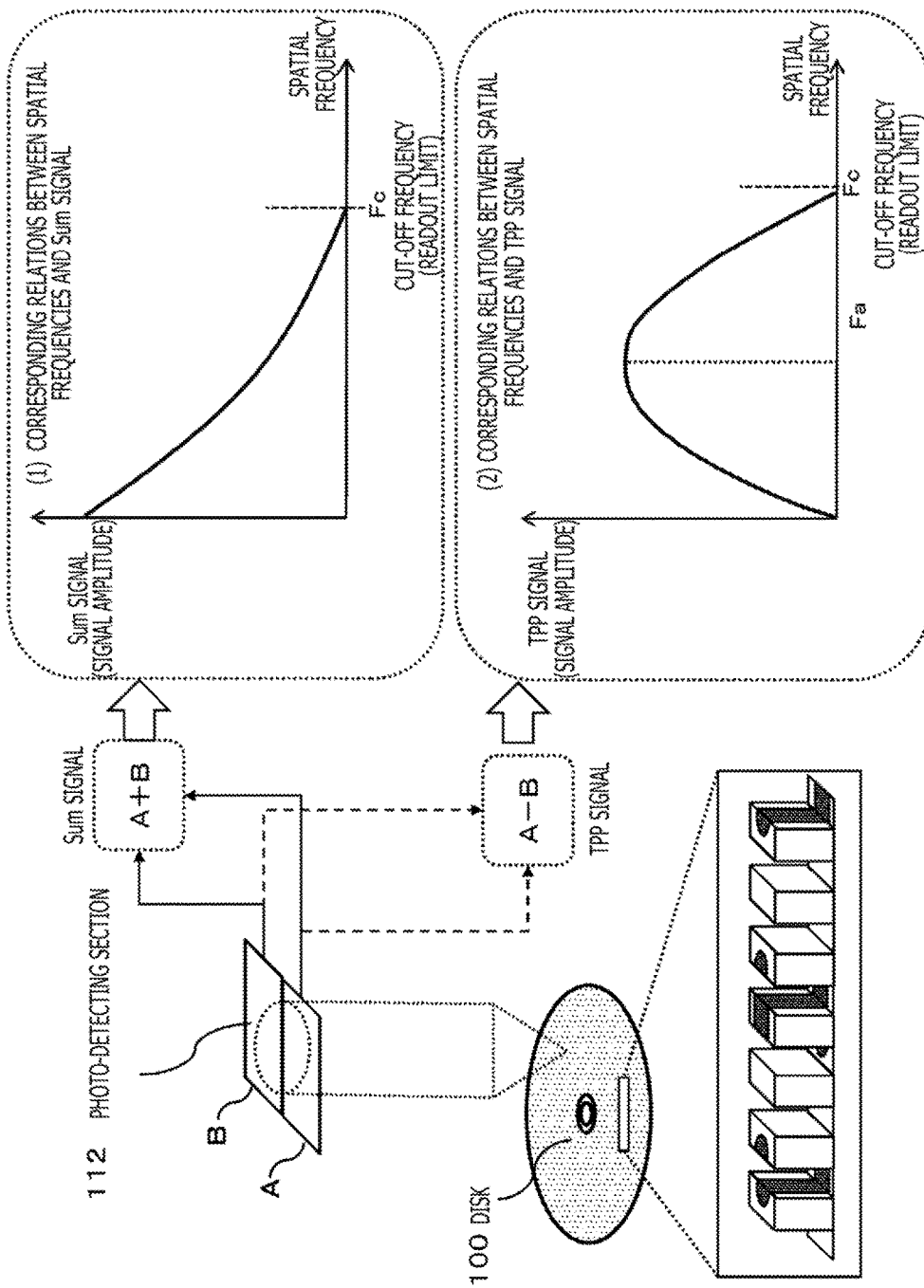
FIG. 8 is an explanatory diagram explaining typical signals obtained on the basis of a readout signal from the disk.

FIG. 8 is an explanatory diagram explaining the characteristics of the sum signal and of the TPP signal.

The disk 100 stores a carrier (protruding and recessed pattern) recorded in the track direction with frequencies higher than the cut-off frequency Fc. A record signal made up of mark arrays is recorded on the carrier.

The photo-detecting section 112 of the pickup has two split detectors A and B in the track direction.

Each of the split detectors of the photo-detecting section receives reflected light of a laser beam emitted to the disk 100, and outputs an electrical signal reflecting the amount of light received.

The electrical signal output from the detector A is designated by reference character A, and the electrical signal from the detector B is indicated by reference character B.

The sum signal generating section (Sum) 121 explained above with reference to FIG. 6 generates an addition signal A+B (=sum signal) summing up the outputs of the two detectors.

Meanwhile, the differential signal generating section (TPP) 131 explained above with reference to FIG. 6 generates a differential signal A−B (=TPP signal) representing the difference between the outputs of the two detectors.

The graph in Subfigure (1) in FIG. 8 depicts signal characteristics of the output of the sum signal generating section (Sum) 121, i.e., of the addition signal A+B (=sum signal) summing up the outputs of the two detectors.

This graph is the same as the graphs explained above with reference to FIGS. 3 and 4.

The output (signal amplitude) of the sum signal generating section (Sum) 121 varies depending on the spatial frequency of the data recorded on the disk 100, as depicted in the graph of Subfigure (1) in FIG. 8.

That is, the higher the spatial frequency, i.e., the higher the recording density on the disk, the smaller the output (signal amplitude) of the sum signal (A+B) becomes.

When the spatial frequency is higher than the frequency Fc depicted in the graph, the signal amplitude is 0. That means it is impossible to distinguish the data recorded on the disk having a recording density with a spatial frequency higher than or equal to the frequency Fc.

As described above, the cut-off frequency Fc, which is the spatial frequency constituting the readout limit, is the resolution limit defined as Fc=2 NA/$\lambda$ where $\lambda$ stands for the wavelength of the laser beam from the optical pickup and NA for the numerical aperture of the lenses constituting the optical pickup.

Meanwhile, the graph in Subfigure (2) in FIG. 8 depicts the signal characteristics of the output of the differential signal generating section (TPP) 131, i.e., of the differential signal A−B (=TPP signal) representing the difference between the outputs of the two detectors.

The output (signal amplitude) of the differential signal generating section (TPP) 131 varies depending' on the spatial frequency of the data recorded on the disk 100, as depicted in the graph of Subfigure (2) in FIG. 8.

That is, the signal amplitude of the TPP signal plots a smooth, mound-shaped curve in keeping with changing spatial frequencies.

As discussed above, the carrier (protruding and recessed pattern) recorded in the track direction with frequencies higher than the cut-off frequency Fc is formed on the disk 100. The signal made up of mark arrays is recorded on the carrier.

The optical pickup reads the superimposed signal having the two signals (carrier signal and record signal) superimposed on each other, i.e., reads a multiplication of complex reflectance rates. The amplitude of the TET signal corresponds to the amplitude of the moire signal obtained as the superimposed signal having the two signals superimposed on each other.

For example, the amplitude of the TPP signal is maximized at a spatial frequency Fa in the graph of Subfigure (2) in FIG. 8. The spatial frequency Fa is the point at which the moire signal as the superimposed signal of the two signals (carrier signal and record signal) is most distinctly reproduced.

Figure 9:
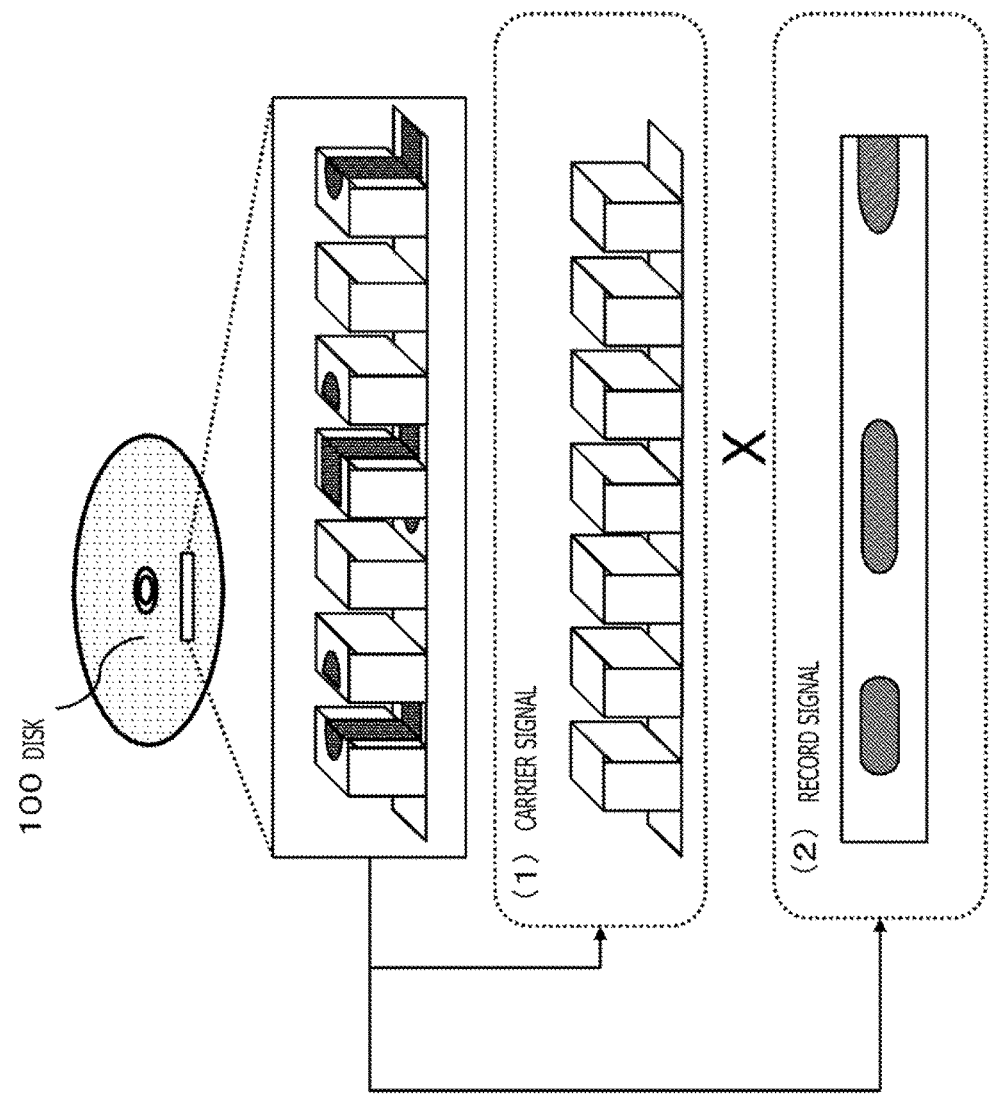
FIG. 9 is an explanatory diagram explaining a typical disk structure.

FIG. 9 is an explanatory diagram explaining a carrier signal structure and a record signal on the disk 100.

As explained earlier, the disk 100 stores the following two kinds of data:

(1) the carrier signal constituted by a protruding and recessed pattern recorded in the track direction with frequencies higher than the cut-off frequency Fc; and (2) the record signal made up of mark arrays recorded on the carrier signal.

Figure 10:
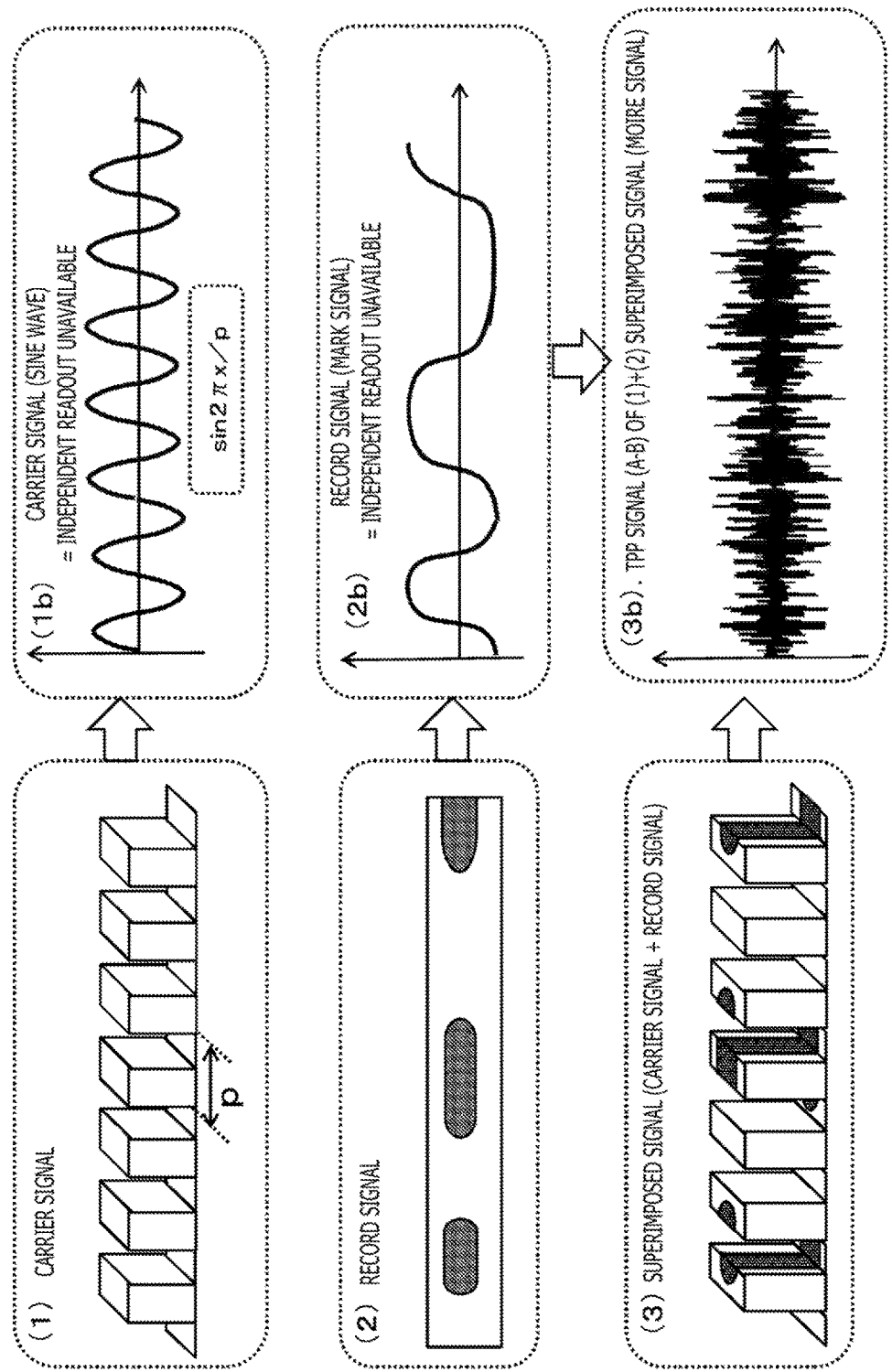
FIG. 10 is an explanatory diagram explaining corresponding points between a disk structure and a reproduced signal.

FIG. 10 depicts typical data of these two signals (the carrier signal and the record signal on the disk) and of the superimposed signal (moire signal) made up of the two signals.

FIG. 10 indicates the structures of the following three signals on the disk together with readout signals from these structures:

(1) the carrier signal on the disk;

(2) the record signal; and (3) the superimposed signal (carrier signal x record signal on the disk).

(1) The carrier signal is constituted by a protruding and recessed pattern recorded in the track direction on the disk with frequencies higher than the cut-off frequency Fc.

The readout signal of this structure, as depicted in Subfigure (1b) in FIG. 10, corresponds to a regularly periodic sine wave [$\mathrm{Sin}(2\pi x/p)$], where p denotes the period of the protruding and recessed pattern.

It is to be noted that the period of the sine wave depicted in Subfigure (1b) in FIG. 10 has frequencies higher than the cut-off frequency (Fc) and that the sine wave cannot be read directly by the optical pickup depicted in FIG. 1 or 6, for example.

(2) The record signal is made up of mark arrays recorded on (1) the carrier signal described above.

The record signal includes diverse frequency components ranging from low-frequency components lower than the cut-off frequency (Fc) to high-frequency components higher than the cut-off frequency (Fc).

The readout signal of this structure corresponds to the signal depicted in Subfigure (2b). Whereas it is possible to read the low-frequency component range using the optical pickup depicted in FIG. 1 or 6, for example, the high-frequency component signal cannot be read out.

(3) The superimposed signal (carrier signal×record signal) is constituted by the record signal superimposed on the carrier signal over the disk.

The signal depicted in Subfigure (3b) in FIG. 10 is a TPP signal obtained as the readout signal of a signal range A (reproducible range A) of the superimposed signal, i.e., a typical TPP signal output by the differential signal generating section (TPP) 131 explained above with reference to FIG. 6.

This TPP signal is a signal pattern read out as the superimposed signal constituted by the carrier signal made of the sine wave depicted in Subfigure (1b) in FIG. 10 and by the record signal indicated in Subfigure (2b) in FIG. 10, i.e., a signal pattern read out as the moire signal.

This is a signal that is actually read by the optical pickup depicted in FIG. 1 or 6.

The TPP signal depicted in Subfigure (3b) is a multiplication of the carrier signal component and the record signal component. This is a signal obtained by having the high-frequency component of the record signal shifted lower by the amount of the carrier signal frequency. Shifting the frequency of this TPP signal higher by the amount of the carrier signal frequency reconstitutes the frequency of the record signal component on the disk.

The process above is carried out by the multiplier 132 explained above with reference to FIG. 6, i.e., the process of multiplying the TPP signal with the separately generated carrier signal [$\mathrm{Sin}(2\pi x/p)$].

Figure 11:
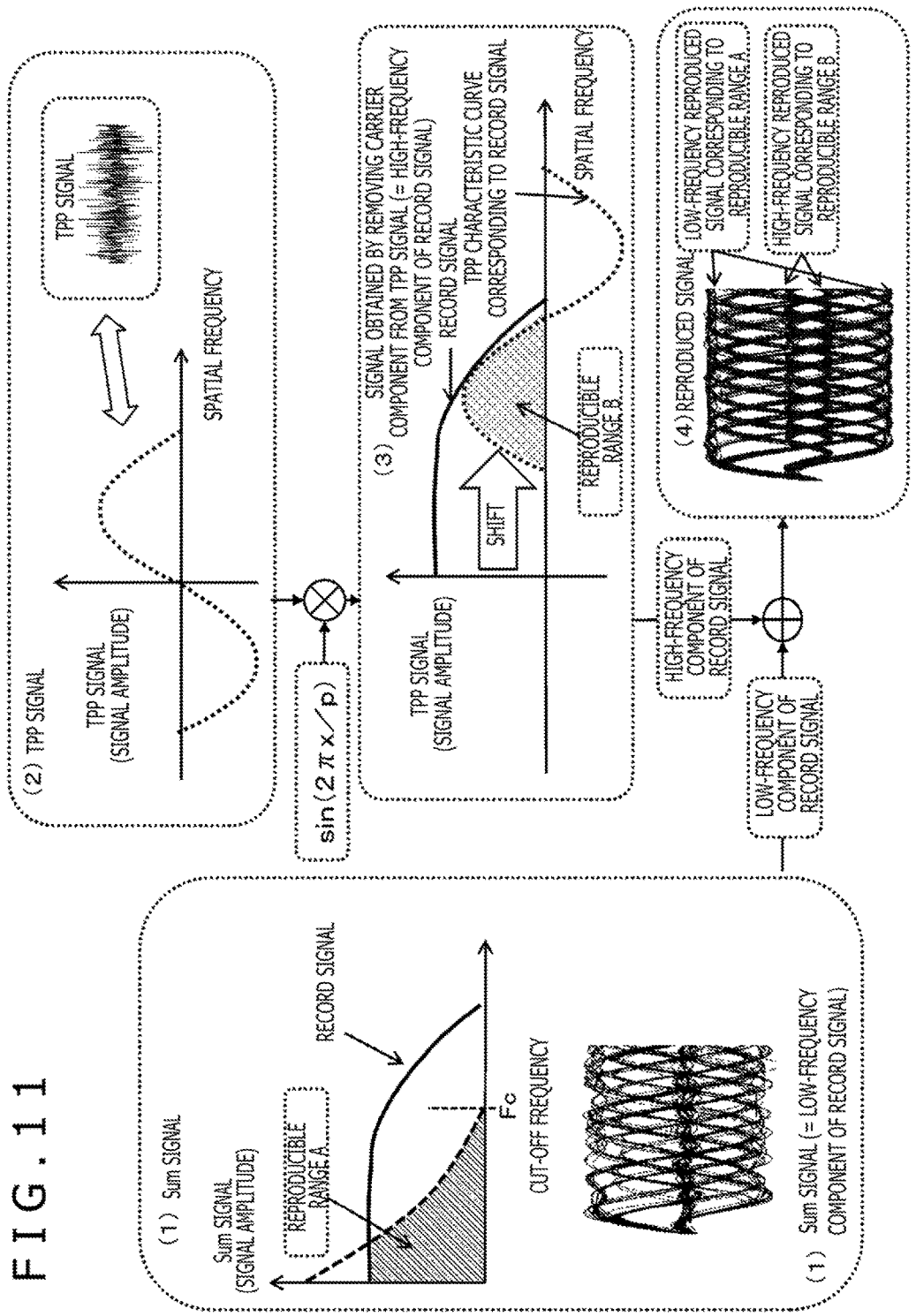
FIG. 11 is an explanatory diagram explaining typical signals obtained by a reproduction process.

Explained below with reference to FIG. 11 is the process of extracting the record signal through the multiplication process.

FIG. 11 depicts the following signals:

(1) a sum signal (=low-frequency component of the record signal);

(2) a TPP signal;

(3) a signal obtained by frequency-shifting the TPP signal by the amount of the carrier signal frequency (=high-frequency component of the record signal); and (4) a reproduced signal.

The sum signal in Subfigure (1) in FIG. 11 (=low-frequency component of the record signal) is depicted together with the graph indicating the corresponding relations between spatial frequencies and the sum signal explained above with reference to Subfigure (1) in FIG. 8, and a reproduced signal pattern based on the sum signal.

A dotted line in the graph constitutes the signal characteristics of the sum signal A+B output from the sum signal generating section (Sum) 121 depicted in. FIG. 6, i.e., from the two detectors. As such, the dotted line graphically represents a sum characteristic curve.

The output (signal amplitude) of the sum signal generating section (Sum) 121 varies depending on the spatial frequency of the data recorded on the disk 100, as indicated by the graph in Subfigure (1) in FIG. 11.

That is, the higher the spatial frequency, i.e., the higher the recording density on the disk, the smaller the output (signal amplitude) of the sum signal (A+B) becomes.

When the spatial frequency is higher than the frequency Fc depicted in the graph, the signal amplitude is 0. That means it is impossible to distinguish the data recorded on the disk having a recording density with a spatial frequency higher than or equal to the frequency Fc.

As described above, the cut-off frequency Fc, which is the spatial frequency constituting the readout limit, is the resolution limit defined as Fc=2 NA/λ where λ stands for the wavelength of the laser beam from the optical pickup and NA for the numerical aperture of the lenses constituting the optical pickup.

A solid line in the graph represents the frequency distribution of the record signal recorded on the disk 100.

The record signal includes diverse frequency components ranging from low-frequency components lower than the cut-off frequency (Fc) to high-frequency components higher than the cut-off frequency (Fc).

In the record signal indicated by the solid line, the portion inside the sum characteristic curve plotted by the dotted line makes up a signal range that can be reproduced using the sum signal (reproducible range A).

The portion outside the sum characteristic curve represented by the dotted line is a signal range that cannot be reproduced using the sum signal.

The graph in Subfigure (2) in FIG. 11 indicates the signal characteristics of the differential signal A–B made of the output from the differential signal generating section (TPP) 131 explained above with reference to Subfigure (2) in FIG. 8, i.e., of the output from the two detectors.

The output (signal amplitude) of the differential signal generating section (TPP) 131 varies depending on the spatial frequency of the data recorded on the disk 100, as indicated by the curve (TPP characteristic curve) in Subfigure (2) in FIG. 11.

The record signal component is then extracted by shifting the TPP signal by the amount of the carrier signal frequency on the disk.

The process of shifting the TPP signal by the amount of the carrier signal frequency is carried out by the multiplier 132 explained above with reference to FIG. 6, i.e., the process of multiplying the TPP signal with the separately generated carrier signal [Sin(2 πx/p)].

The signal depicted in Subfigure (3) in FIG. 11 is obtained by the process of multiplying the TOP signal depicted in Subfigure (2) in FIG. 11 with the separately generated carrier signal [Sin(2 πx/p)].

The signal in Subfigure (3) in FIG. 11 is thus a signal obtained by shifting the TPP signal in Subfigure (2) in FIG. 11 to the high-frequency range.

The high-frequency component in the record signal recorded on the disk is reconstituted from the carrier signal on the disk and from the TPP signal as the readout signal obtained by frequency-shifting the superimposed signal of the carrier signal and the record signal, through the process of multiplying the TPP signal depicted in Subfigure (2) in FIG. 11 with the separately-generated carrier signal [Sin(2 πx/p)]. As a result of the multiplication process, the characteristic curve of only the record signal included in the TPP signal depicted in Subfigure (3) in FIG. 11, i.e., the TPP characteristic curve corresponding to the record signal, is obtained.

A dotted line depicted in Subfigure (3) in FIG. 11 represents the TPP characteristic curve corresponding to the record signal.

That is, the TPP signal output from the differential signal generating section 131 in FIG. 6 is multiplied by the separately generated carrier signal [Sin(2 πx/p)]. This removes the carrier signal component from the TPP signal. The result is the frequency-shifted TPP signal in Subfigure (3) in FIG. 11, i.e., the TPP characteristic curve corresponding to the record signal containing only the record signal component.

A solid line in this graph is similarly to the solid line depicted in Subfigure (1) in FIG. 11, and represents the frequency distribution of the record signal on the disk.

In the record signal range delimited by the solid line, the range inside the TPP characteristic curve corresponding to the record signal plotted by the dotted line is a signal range that can be reproduced using the TPP signal (reproducible range B).

The portion outside the TPP characteristic curve corresponding to the record signal plotted by the dotted line constitutes a signal range that cannot be reproduced using the TPP signal.

The signal range A (reproducible range A) in the graph depicted in Subfigure (1) in FIG. 11 corresponds to the low-frequency range signal in the record signal.

On the other hand, the signal range B (reproducible range B) in the graph depicted in Subfigure (3) in FIG. 11 corresponds to the high-frequency range signal in the record signal.

Combining the above two signals provides a reproduced signal depicted in Subfigure (4) in FIG. 11.

The reproduced signal depicted in Subfigure (4) in FIG. 11 is similarly to the reproduced signal explained above with reference to Subfigure (2) in FIG. 6.

The reproduced signal depicted in Subfigure (4) in FIG. 11 is a composite signal of the following two signals:

(a) a low-frequency component signal corresponding to the signal range A (reproducible range A) in the graph depicted in Subfigure (1) in FIG. 11; and (b) a high-frequency signal corresponding to the signal range B (reproducible range B) in the graph depicted in Subfigure (3) in FIG. 11.

The low-frequency component signal corresponding to the signal range A (reproducible range A) depicted in Subfigure (1) in FIG. 11 is a reproduced signal based on the sum signal of the upper and lower ends in Subfigure (4) in FIG. 11. The low-frequency component in the record signal with frequencies lower than or equal to the cut-off frequency (Fc) may be acquired from the sum base reproduced signal this manner.

On the other hand, the high-frequency component signal corresponding to the signal range B (reproducible range B) depicted in Subfigure (3) in FIG. 11 is a reproduced signal based on the TPP signal separated into the upper and lower portions in the center region of Subfigure (4) in FIG. 11. The high-frequency component in the record signal with frequencies higher than or equal to the cut-off frequency (Fc) may be acquired from the TPP base reproduced signal in this manner.

It is to be noted that, as described above, the reproduced signal based on the sum signal is obtained through the sum signal generating section (Sum) 121 and the gain controlling section (K1) 122 in the configuration depicted in FIG. 6.

In addition, the reproduced signal based on the TPP signal is obtained through the differential signal generating section (TPP) 131, the multiplier 132, and the gain controlling section (K2) 133 indicated in the configuration depicted in FIG. 6.

4. Typical Simulation of the Process of Reproducing Data from the Disk having M-sequence Random Data Recorded thereon Explained below is a typical simulation of the process of reproducing data using the above-described sum signal and TPP signal.

Figure 12:
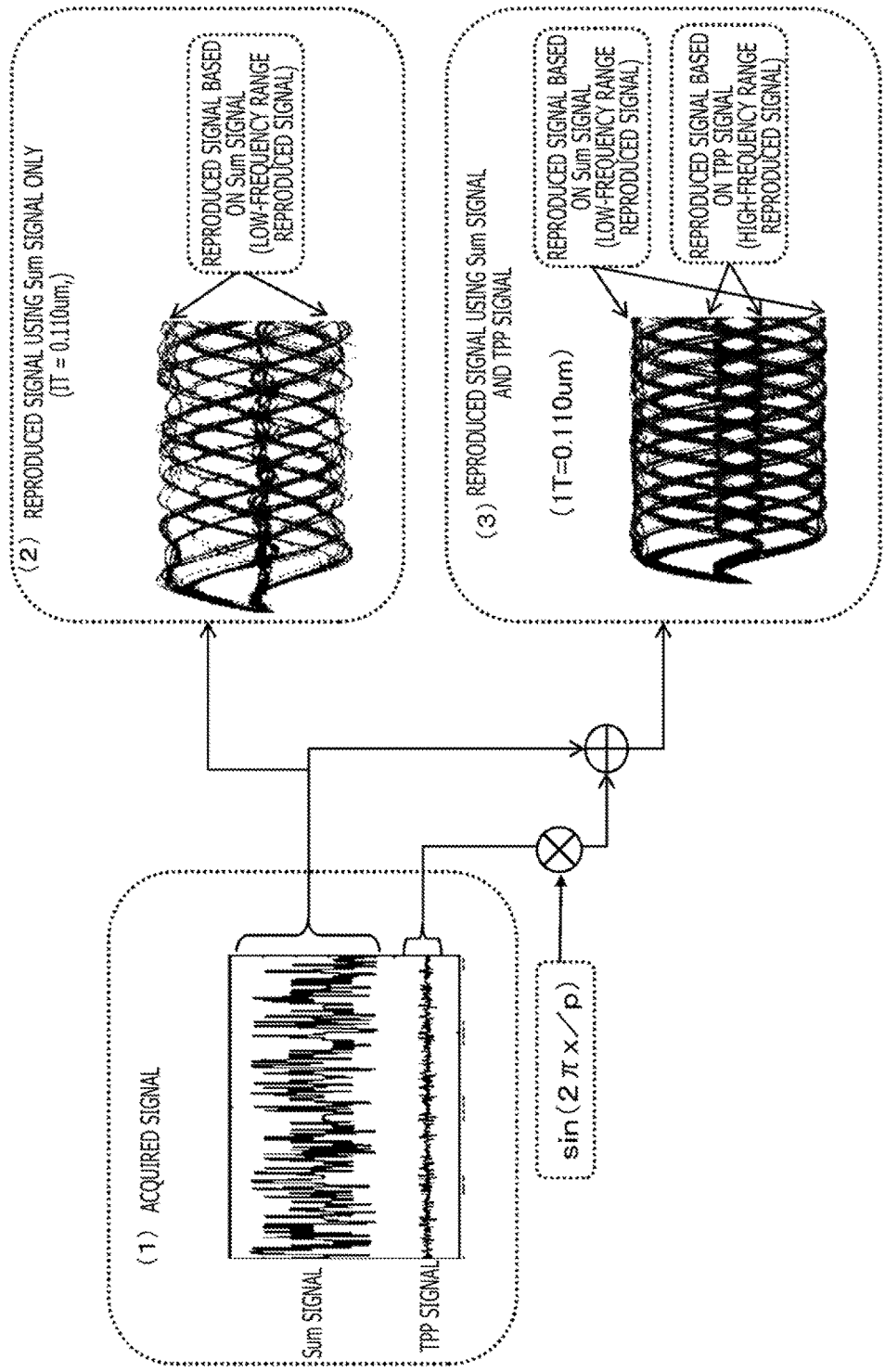
FIG. 12 is an explanatory diagram explaining typical signals obtained by the reproduction process.

FIG. 12 depicts typical reproduced data from the simulation in which data was recorded and reproduced under the following condition settings.

The conditions are as follows:
Laser wavelength of the optical pickup: λ=405 nm
Numerical aperture of the optical pickup: NA=0.85
Cut-off mark length (half of the cut-off period): λ/4 NA=119 nm.
Recorded data=M-sequence (random numbers)
Minimum mark (pit) length: 1T=110 nm (less than or equal to the cut-off mark length)
Carrier period: p=82.5 nm
Data was recorded using an isolated track method in which data was recorded only on one track and not on adjacent tracks.

FIG. 12 gives respective subfigures representing the details resulting from the simulation of data reproduction under the above-described condition settings. The subfigures indicate:

(1) a sum signal and a TPP signal acquired from the readout signal from the disk;

(2) a reproduced signal pattern using the sum signal only; and (3) a reproduced signal pattern using the sum signal and the TPP signal.

These are the data obtained (as a result of the simulation).

Subfigure (1) in FIG. 12 depicts a typical sum signal and a typical TPP signal acquired from the readout signal from the disk.

The acquired signals depicted in Subfigure (1) are two reproduced signals obtained using the reproduction apparatus configured as explained above with reference to FIG. 6, the reproduction apparatus reproducing the signals from the disk 100 by means of the split detectors (A, B) of the photo-detecting section 112. The two reproduced signals are:

(a) the sum signal (A+B); and (b) the TPP signal (A−B).

(a) The sum signal. (A+B) corresponds to the output signal from the sum signal generating section (Sum) 121 in the configuration of FIG. 6.

(b) The TPP signal (A−B) corresponds to the output signal from the differential signal generating section (TPP) 131 in the configuration of FIG. 6.

Subfigure (2) in FIG. 12 depicts a typical reproduced signal obtained using only the sum signal (A+B). This signal corresponds to the output signal from the gain controlling section 122 in the configuration of FIG. 6.

This is the reproduced signal corresponding to the sum base reproduced signal depicted in Subfigure (1) in FIG. 6.

The reproduced signal obtained using only the sum signal depicted in Subfigure (2) in FIG. 12 is a low-frequency component signal with frequencies lower than the cut-off frequency Fc, the low-frequency component being divided into the upper and lower portions of the waveform and thus reproduced as 1 or 0 signal values.

On the other hand, a high-frequency component signal with frequencies higher than the cut-off frequency Fc is not divided into the upper and lower portions of the waveform. The high-frequency component is concentrated on the center region, i.e., on a boundary region at the center of the up-down direction of the waveform. As a result, the high-frequency component signal cannot be reproduced as 1 or 0 signal values.

Subfigure (3) in FIG. 12 depicts a typical reproduced signal obtained using the sum signal (A+B) and the TSP signal (A−B). This signal corresponds to the output of the composite signal generating section 141 in the configuration of FIG. 6.

The reproduced signal depicted in Subfigure (3) in FIG. 12 is a composite signal of the following two signals:

(a) a sum base reproduced signal representing the low-frequency component in the record signal with frequencies lower than or equal to the cut-off frequency (Fc); and (b) a TPP base reproduced signal representing the high-frequency component in the record signal with frequencies higher than or equal to the cut-off frequency (Fc).

It is to be noted that the sum base reproduced signal is obtained through the sum signal generating section (Sum) 121 and the gain controlling section (K1) 122 in the configuration depicted in FIG. 6.

In addition, the TPP base reproduced signal is obtained through the differential signal generating section (TPP) 131, the multiplier 132, and the gain controlling section (K2) 133.

The TPP base reproduced signal is acquired by removing the carrier signal component from the superimposed signal (moire signal) made up of the following two different signals:

(a) the carrier (protruding and recessed pattern) recorded in the track direction with frequencies higher the cut-off frequency Fc; and (b) the record signal made up of mark arrays recorded on the carrier.

The moire signal often occurs at low frequencies in a range where the carrier signal on the disk with frequencies higher than the cut-off frequency (Fc) and the high-frequency portion in the record signal with frequencies higher than the cut-off frequency (Fc) are superimposed on each other.

That is, a distinct moire signal is not much generated from the low-frequency portion in the record signal with frequencies lower than the cut-off frequency (Fc). From the TPP base reproduced signal, only the high-frequency range signal in the record signal is extracted.

Thus the composite signal generating section 141 combines the high-frequency range signal in the record signal obtained from the TPP base reproduced signal, with the low-frequency range signal in the record signal acquired from the sum base reproduced signal, the low-frequency range signal having frequencies lower than the cut-off frequency (Fc). In so doing, the composite signal generating section 141 acquires a reproduced signal with a wide frequency band ranging from the low to high frequencies in the record signal, the reproduced signal being depicted in Subfigure (2) in FIG. 12.

5. Typical Simulation of the Process of Reproducing Data from the Disk having (1, 7) RLL Data Recorded thereon Explained below is a typical simulation of the process of reproducing data from the disk having (1, 7) RLL data recorded thereon, the recorded data being found on many BDs (Blu-ray™ Discs).

It is to be noted that BDs utilize the RLL-PP modulation method (RLL: Run Length Limited, PP: Parity preserve/Prohibit rmtr (repeated minimum transition runlength)), which improves on the existing (1, 7) RLL modulation method.

Compared with the existing (1, 7) RLL modulation method, the (1, 7) RLL-PP modulation method has a number of improvements including suppression of the DC component and constraints on the repeat count of minimum marks and minimum spaces.

What follows is a brief description of the RLL (Run Length Limited) code as a technique used for recording and reproducing high-density data to and from the optical disk.

As the storage capacity of optical disks increases, so does their recording density. When recording density is raised, the Nyquist condition is not met, which likely entails intersymbol interference. The RLL (Run Length Limited) code involves widening the interval between edges so as to minimize the occurrence of intersymbol interference while improving recording density. The RLL code is a variation of run-length coding. This is a technique that involves limiting the maximum and minimum run lengths for run-length coding by which m-bit recorded data is converted to n-bit data, n being different from m.

A minimum inversion interval [Tmin] of the RLL code is defined by the following expression:

$$Tmin\ (d+1)\ (m/n)Td$$

where, Td denotes the clock pulse width; d represents the maximum number of consecutive 0s in an NRZI (Non Return to Zero Inverted) signal, which is a record signal generated by inverting the polarity of pulses in accordance with the values of 0s or 1s in the modulated data to be recorded; and (d+1) stands for the minimum run length. Note that a value Tmin/Td, which represents recording density ratio, is preferably longer in view of optical constraints.

Further, a maximum inversion interval [Tmax] of the RLL code is defined by the following expression:

$$Tmax=(k+1)\ (m/n)Td$$

where, Td denotes the clock pulse width; k represents the maximum number of consecutive 0s in the NRZI (Non Return to Zero Inverted) signal; and (k+1) stands for the maximum run length. Note that a value Tmax/Td is preferably shorter in view of the stable generation of clock pulses.

Further, a detection window width. [Tw] is defined by the following expression:

$$Tw=(m/n)\ Td$$

The width, which can represent an allowable jitter amount, is preferably larger. The larger the detection window width [Tw], the easier it is to read the reproduced signal. In a case where the detection window width [Tw] is small, highly precise reading is required.

One variation of the RLL (Run Length Limited) code is the (1, 7) RLL modulation method based on the conversion of two-bit data to three-bit data.

The modulation based on the (1, 7) RLL modulation method constitutes a data conversion method in which the number of consecutive 0s in modulated bits is between a minimum of 1 and a maximum of 7 under the (1, 7) RLL run-length constraints.

Given modulated data based on the (1, 7) RLL modulation method, recording units called recording frames (Recording Frames) are generated in synchronism with a synchronizing signal and recorded on the disk.

It is to be noted that, in the conversion process above, a conversion table is utilized.

The conversion table is used in the process of modulating two-bit data into three-bit data in accordance with the (1, 7) RLL run-length rules. A specific example of the conversion table is depicted in FIG. 13.

As depicted in FIG. 13, the conversion table associates input bits with modulated data bits. For example, if the input data is [00000000], the modulated data bits are [010100100100]. Where the input data is [11], the modulated data bits are [000] if the preceding modulated data bits are [xx1] or are [101] if the preceding modulated data bits are [xx0].

When the conversion of two-bit data into three-bit data is carried out according to the conversion table above, modulated data bits are generated in accordance with the (1, 7) RLL run-length rules.

The simulation explained below is that of the process of reproducing (1, 7) RLL data recorded on a disk (BD). The feasibility of raising the data recording density on the BD was examined on the basis of the results of this simulation.

The simulation, as well as evaluation experiments, was conducted under the following settings for this examination:

(1) An evaluation of (1, 7) pp, e-MLSE was carried out to quantify the influence of noise on the reproduction process.

Note that the e-MLSE (Maximum Likelihood Sequence Error) is the evaluation index for reproduced data and will be discussed later in detail.

(2) The carrier formed on the disk was set for a 3T monotone (6T period) frequency of (1, 7) pp. This is equivalent to approximately 1.5 times the cut-off frequency (Fc).

Note that this setting was intended to appropriate a spectrum overlap region after the sum signal and the TPP signal used in the reproduction process were demodulated.

(3) The recorded spectrum bandwidth of (1, 7) pp modulated data in the record signal was limited to lower than or equal to the carrier frequency.

(4) Cut-off mark length (half of the cut-off period): $\lambda/4$ NA=119 nm (5) Clock length: 1T–81 nm FIG. 14 is an explanatory diagram explaining (1, 7) RLL-pp modulated data as the record signal as well as the carrier signal used in the simulation.

Figure 14:
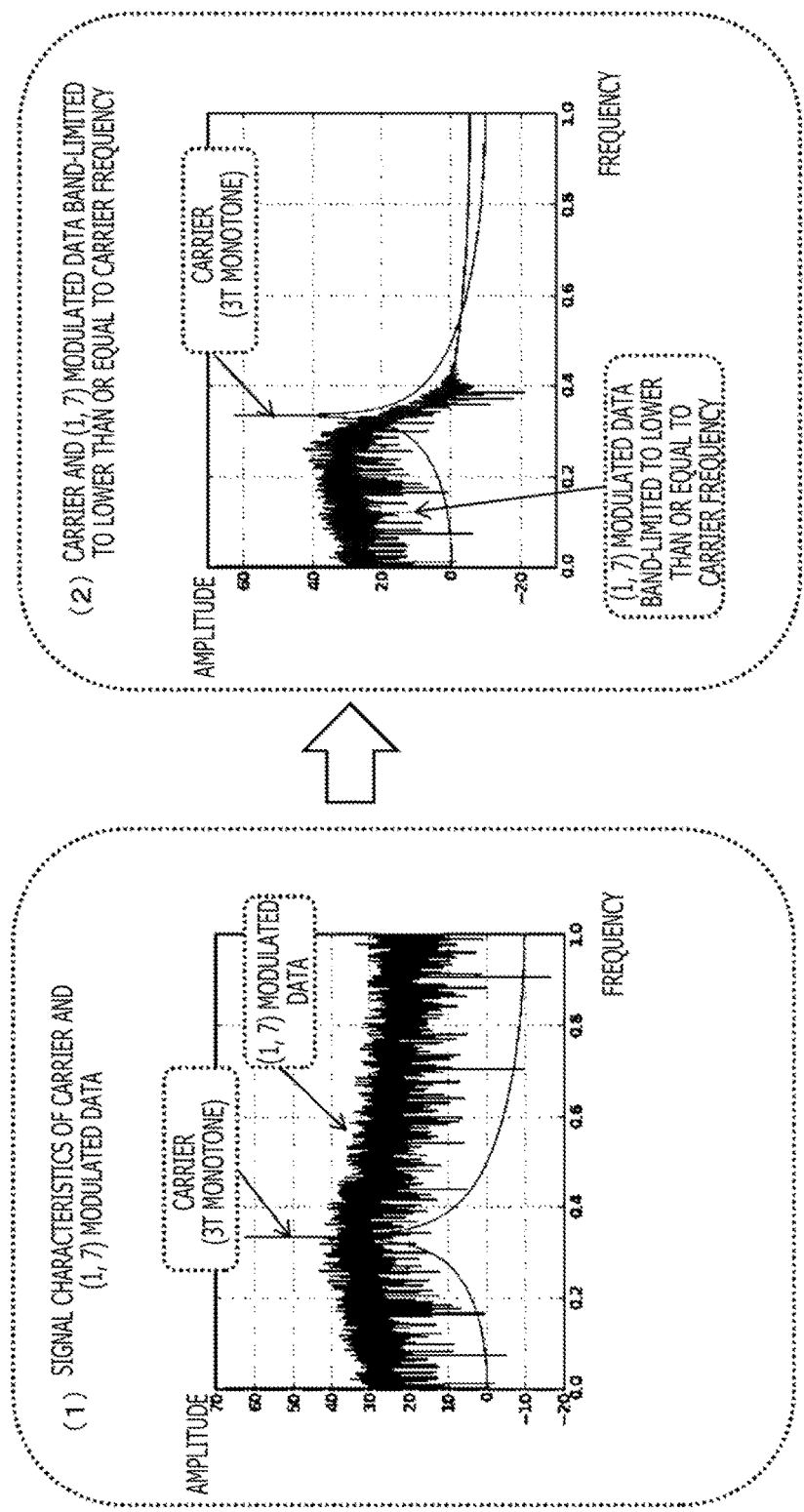
FIG. 14 is an explanatory diagram explaining (1, 7) RLL data used in a reproduction simulation.

Subfigure (1) in FIG. 14 is a graph with the horizontal axis denoting frequencies and the vertical axis representing amplitudes. The graph plots a 3T frequency carrier and the (1, 7) RLL-pp modulated data as the record signal.

In the simulation, as depicted in Subfigure (2) in FIG. 14, the wide frequencies of (1, 7) RLL-pp modulated data as the record signal were cut off, and the recorded spectrum bandwidth of the (1, 7) pp modulated data in the record signal was limited to lower than or equal to the carrier frequency.

These are the settings corresponding to the condition (3) above.

The necessity of the condition (3) above is as follows:

(3) The recorded spectrum bandwidth of (1, 7) pp modulated data in the record signal is to be limited to lower than or equal to the carrier frequency.

Figure 15:
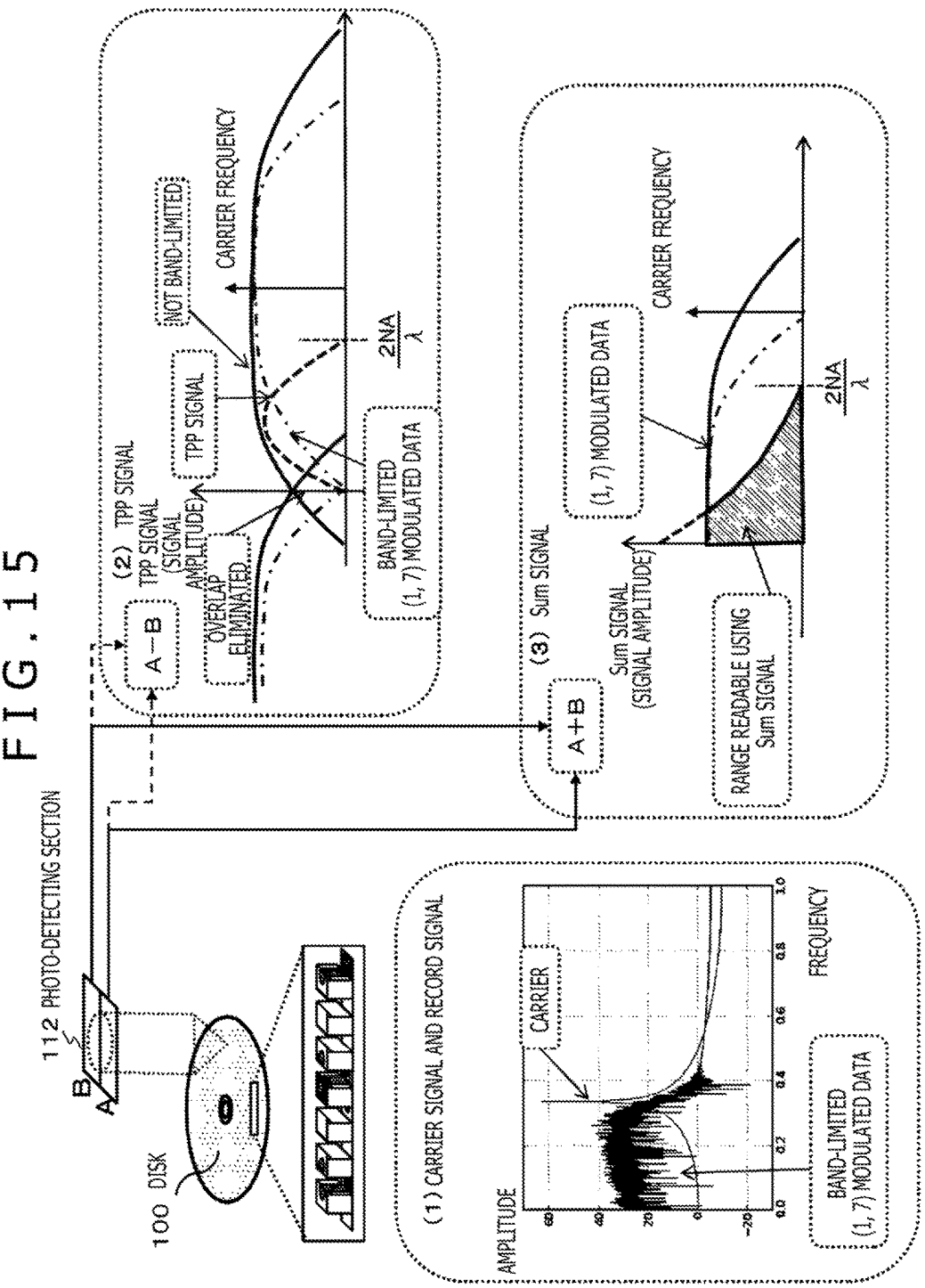
FIG. 15 is an explanatory diagram explaining the reproduction process simulation in which (1, 7) RLL data is used as recorded data.

Explained below with reference to FIG. 15 is the reason for the need for the setting above.

FIG. 15 depicts the following signals:

(1) Carrier signal and record signal
(2) TPP signal
(3) Sum signal

Subfigure (1) in FIG. 15 depicting a carrier signal and a record signal indicates the same graph explained above with reference to Subfigure (2) in FIG. 14. The graph depicts the frequency distribution of a carrier (3T) and a record signal with its high frequencies cut off.

The wide frequencies of the (1, 7) RLE-pp modulated data as the record signal were cut off, and the spectrum bandwidth was limited to lower than the carrier frequency.

The reason for the limitations above is, as depicted in Subfigure (2) in FIG. 15 indicated by the solid line, to eliminate a spectrum overlap between signals following the frequency shift by multiplication of the carrier on the disk with the recorded marks ((1, 7) modulated data), so as to obtain a recorded mark signal spectrum band-limited as indicated by dashed lines in the graph. What is eliminated is the overlap between the TPP signal indicated by dotted lines and the record signal (band-limited) denoted by solid lines.

Such an overlap, if taking place, can disable accurate data analysis in signal processing.

In order to eliminate the overlap and to acquire precise results of signal processing, it is necessary to limit the recorded spectrum bandwidth of the (1, 7) pp modulated data in the record signal to lower than or equal to the carrier frequency.

Figure 16:
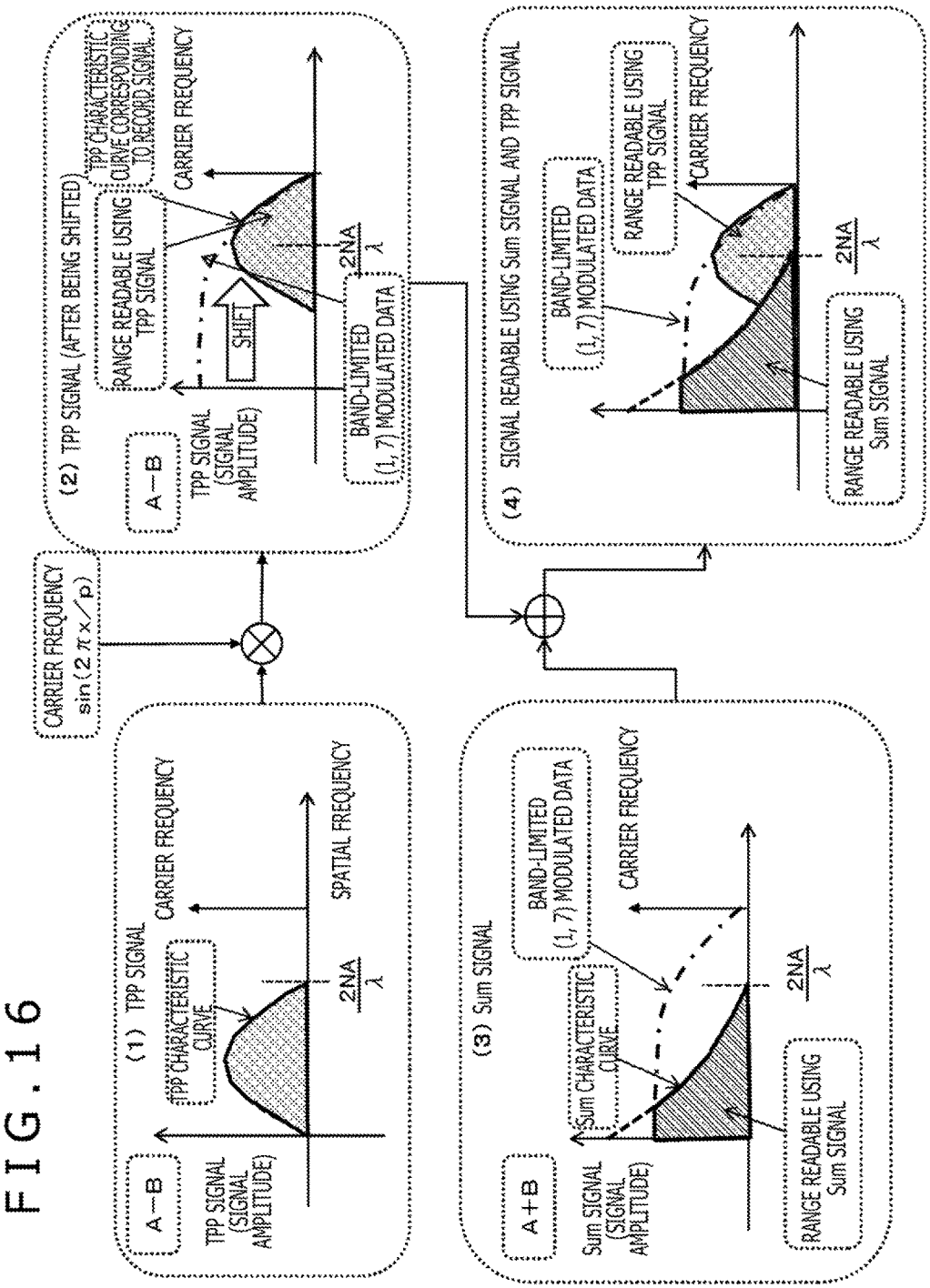
FIG. 16 is another explanatory diagram explaining the reproduction process simulation in which (1, 7) RLL data is used as recorded data.

FIG. 16 is as explanatory diagram explaining the process of generating a reproduced signal using the record signal band-limited as described above.

FIG. 16 gives graphs of the following signals:
(1) TPP signal
(2) TPP signal (after being shifted)
(3) Sum signal
(4) Signal readable using the sum signal and the TPP signal The graph in Subfigure (1) in FIG. 16 depicts the output of the differential signal generating section (TPP) 131 explained above with reference to Subfigure (2) in FIG. 8, i.e., the signal characteristics of the differential signal. A−B output from the two detectors.

The output (signal amplitude) of the differential signal generating section (TPP) 131 varies depending on the spatial frequency of the data recorded on the disk 100, as indicated by the curve (TPP characteristic curve) depicted in Subfigure (1) in FIG. 16.

The record signal component can be extracted by frequency-shifting the TPP signal through multiplication with the carrier signal.

The process of removing the carrier signal component from the TPP signal is performed by the multiplier 132 explained above with reference to FIG. 6, i.e., by multiplying the TPP signal with the carrier signal [Sin(2 πx/p)].

The signal depicted in Subfigure (2) in FIG. 16 is obtained by the process of multiplying the TPP signal depicted in Subfigure (1) in FIG. 16 with the carrier signal [Sin(2 πx/p)].

The signal depicted in Subfigure (2) in FIG. 16 is acquired by shifting the TPP signal depicted in Subfigure (1) in FIG. 16 to the high frequency range.

The record signal reproduced as a moire signal when shifted to the low-frequency range is brought back to the initial frequency band through multiplication of the TPP signal depicted in Subfigure (1) in FIG. 16 with the carrier signal [Sin(2 πx/p)]. This provides the characteristic curve of only the record signal contained in the TPP signal depicted in Subfigure (2) in FIG. 16, i.e., a TPP characteristic curve corresponding to the record signal.

Subfigure (2) in FIG. 16 depicts the TPP characteristic curve corresponding to the record signal, together with the band-limited record signal. The range enclosed by the TPP characteristic curve corresponding to the record signal is a range that is readable using the TPP signal.

In the graph, a dashed line denotes the frequency distribution of the record signal on the disk.

In the record signal range designated by the dashed line, the portion inside the solid-line TPP characteristic curve corresponding to the record signal is a signal range that can be reproduced using the TPP signal.

The portion outside the TPP characteristic curve corresponding to the record signal is a signal range that cannot be reproduced using the TPP signal.

Subfigure (3) sum signal in FIG. 16 depicts a graph indicative of the corresponding relations between the spatial frequency and the sum signal explained above with reference to Subfigure (1) in FIG. 8, along with a pattern of the reproduced signal based on the sum signal.

The graph depicts the output of the sum signal generating section (Sum) 121 depicted in FIG. 6, i.e., the sum characteristic curve representing the signal characteristics of the sum signal A+B output from the two detectors, together with the band-limited record signal.

The output (signal amplitude) of the sum signal generating section (Sum) 121 varies depending on the spatial frequency of the data recorded on the disk 100, as graphically indicated in Subfigure (3) in FIG. 16.

That is, the higher the spatial frequency, i.e., the higher the recording density on the disk, the smaller the output (signal amplitude) of the sum signal (A+B) becomes.

When the spatial frequency is higher than the frequency Fc depicted in the graph, the signal amplitude is 0. That means it is impossible to distinguish the data recorded on the disk having a recording density with a spatial frequency higher than or equal to the frequency Fc.

As described above, the cut-off frequency Fc, which is the spatial frequency constituting the readout limit, is the resolution limit defined as Fc=2 NA/λ, where λ stands for the wavelength of the laser beam from the optical pickup and NA for the numerical aperture of the lenses making up the optical pickup.

A dashed line in the graph denotes the frequency distribution of the record signal recorded on the disk 100.

The record signal includes diverse frequency components ranging from low-frequency components lower than the cut-off frequency (Fc) to high-frequency components higher than the cut-off frequency (Fc).

In the record signal indicated by the dashed line, the portion inside the sum characteristic curve designated by a dotted line is a signal range that can be reproduced using the sum signal.

The portion outside the sum characteristic curve indicted by a sold line is a signal range that cannot be reproduced using the sum signal.

A "range readable using the sum signal" in the graph depicted in Subfigure (3) in FIG. 16 corresponds to the low-frequency range signal in the record signal.

On the other hand, a "range readable using the TPP signal" in the graph depicted in Subfigure (2) in FIG. 16 corresponds to the high-frequency range signal in the record signal.

Combining the above two signals provides a "signal readable using the sum signal and the TPP signal" depicted in Subfigure (4) in FIG. 16.

This signal corresponds to the output of the composite signal generating section 141 in the configuration depicted in FIG. 6.

The "signal readable using the sum signal and the TPP signal" depicted in Subfigure (4) in FIG. 16 combines the following two ranges:

(a) a high-frequency component signal range corresponding to the "range readable using the TPP signal" in the graph depicted in Subfigure (2) in FIG. 16; and (b) a low-frequency signal range corresponding to the "range readable using the sum signal" in the graph depicted in Subfigure (3) in FIG. 16.

It is to be noted that, as described above, the reproduced signal based on the sum signal is obtained through the sum signal generating section (Sum) 121 and the gain controlling section (K1) 122 in the configuration depicted in FIG. 6.

In addition, the reproduced signal based on the TPP signal is acquired through the differential signal generating section (TPP) 131, the multiplier 132, and the gain controlling section (K2) 133 in the configuration indicated in FIG. 6.

As described above, using the sum signal and the TPP signal in combination makes it possible to reproduce the signal with a wide frequency band ranging from low frequencies lower than or equal to the cut-off frequency to high frequencies higher than or equal to the cut-off frequency.

It is to be noted that the formation of the carrier on the disk, i.e., the formation of the protruding and recessed pattern as carrier grooves, has multiple variations.

Two variations of the carrier formation are explained below with reference to FIG. 17.

Figure 17:
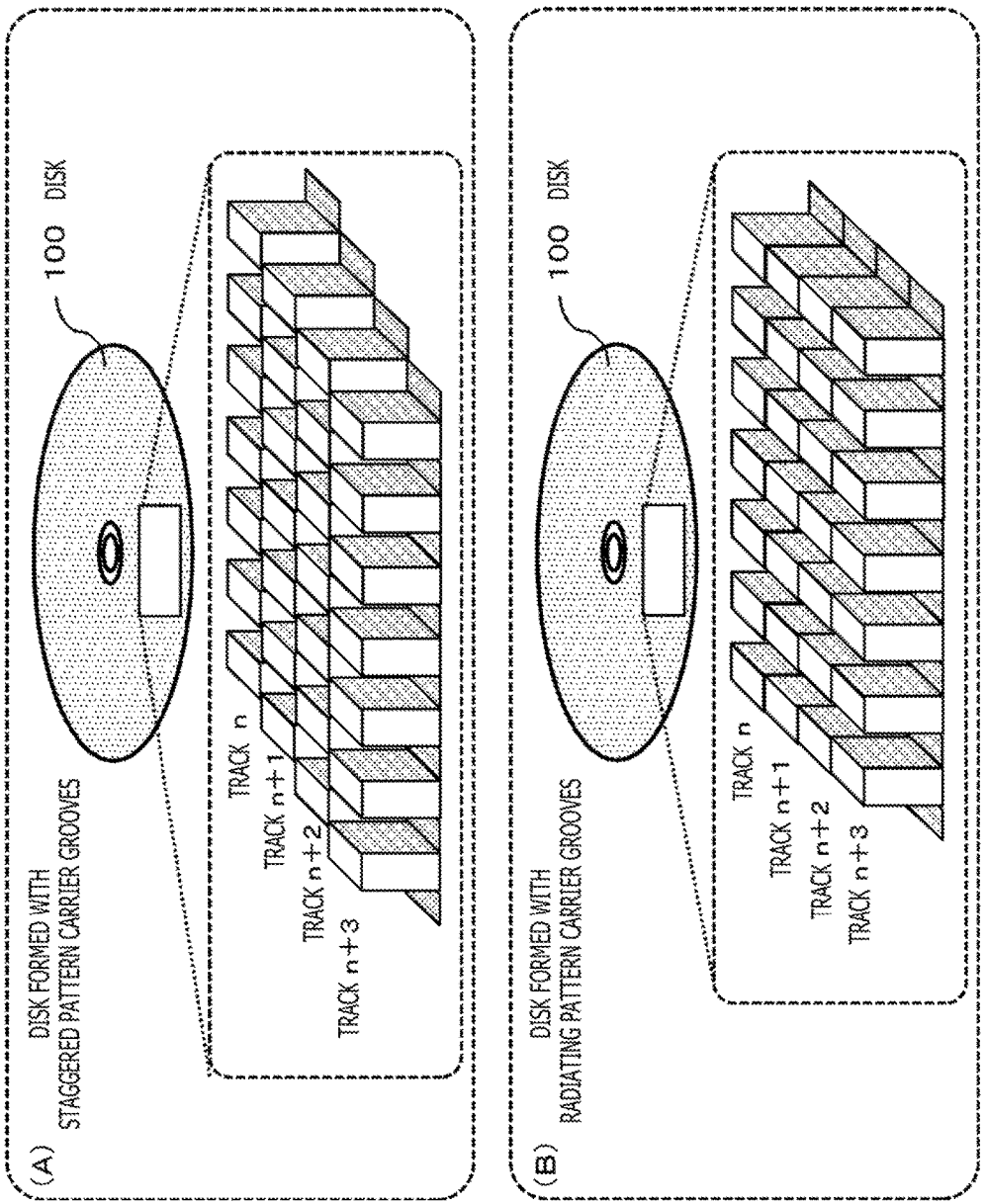
FIG. 17 is an explanatory diagram explaining typical carrier groove structures on the disk.

FIG. 17 depicts disks having two different carriers formed thereon. Depicted in this drawing are the following disks:

(A) a disk formed with staggered pattern carrier grooves; and (B) a disk formed with radiating pattern carrier grooves.

(A) The disk formed with staggered pattern carrier grooves has carrier grooves (protruding and recessed pattern) having protruding and recessed portions arrayed in a staggered manner between adjacent tracks on the disk.

(B) The disk formed with radiating pattern carrier grooves has carrier grooves (protruding and recessed pattern) having protruding and recessed portions aligned between adjacent tracks on the disk.

Examples of how record data and servo data are recorded on the disk are explained below with reference to FIGS. 18 and 19.

Figure 18:
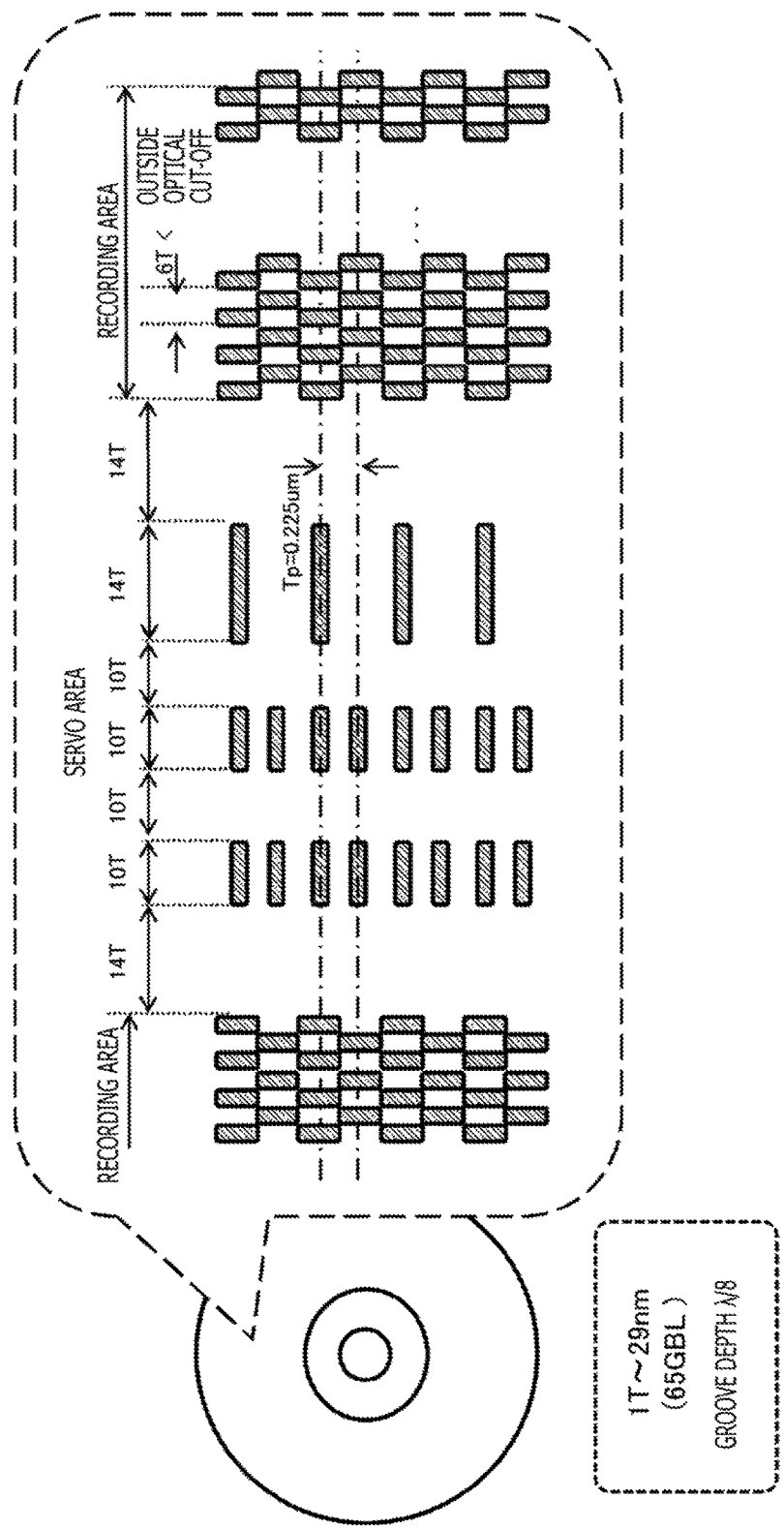
FIG. 18 is an explanatory diagram explaining a typical disk structure in which staggered pattern carrier grooves are formed.

FIG. 18 depicts an example of how record data and servo data are recorded on the disk formed with staggered pattern carrier grooves indicated in Subfigure (A) in FIG. 17.

For example, the record data that constitutes content such as movies alternates with the servo data. That is, as illustrated, a recording area for recording the record data and a servo area for recording the servo data are alternated when recorded.

The staggered pattern carrier grooves (protruding and recessed pattern) are formed in the recording area.

As illustrated, the protruding and the recessed portions are arrayed in a staggered manner between adjacent tracks.

The record signal recorded in the recording area includes a high-frequency range signal with frequencies higher than the cut-off frequency.

The servo data recorded in the servo area is provided as data of a frequency band that can be read using only the usual sum signal, without recourse to the above-described 122 signal. In the example in the drawing, the servo data is recorded using marks 10T to 141.

Figure 19:
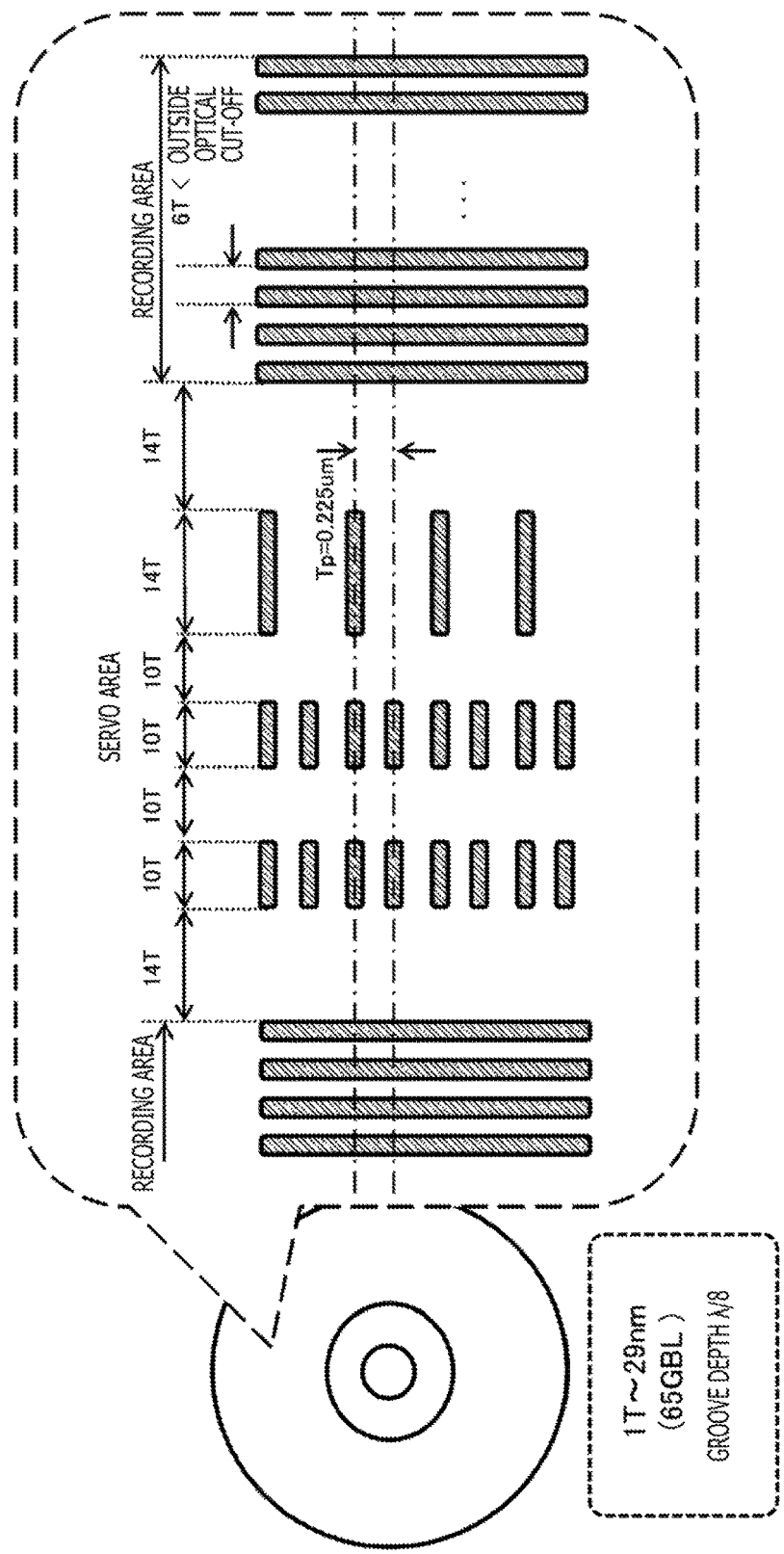
FIG. 19 is an explanatory diagram explaining a typical disk structure in which radiating pattern carrier grooves are formed.

FIG. 19 depicts an example of how record data and servo data are recorded on the disk formed with radiating pattern carrier grooves indicated in Subfigure (B) in FIG. 17.

For example, the record data that makes up content such as movies alternates with the servo data. That is, as illustrated, a recording area for recording the record data and a servo area for recording the servo data are alternated when recorded.

The radiating pattern carrier grooves (protruding and recessed pattern) are formed in the recording area.

As illustrated, the protruding and recessed portions are aligned between adjacent tracks.

The record signal recorded in the recording area includes a high-frequency range signal with frequencies higher than the cut-off frequency.

The servo data recorded is the servo area is provided as data of a frequency band that can be read using only the usual sum signal, without recourse to the above-described TPP signal. In the example in the drawing, the servo data is recorded using marks 10T to 14T.

Figure 20:
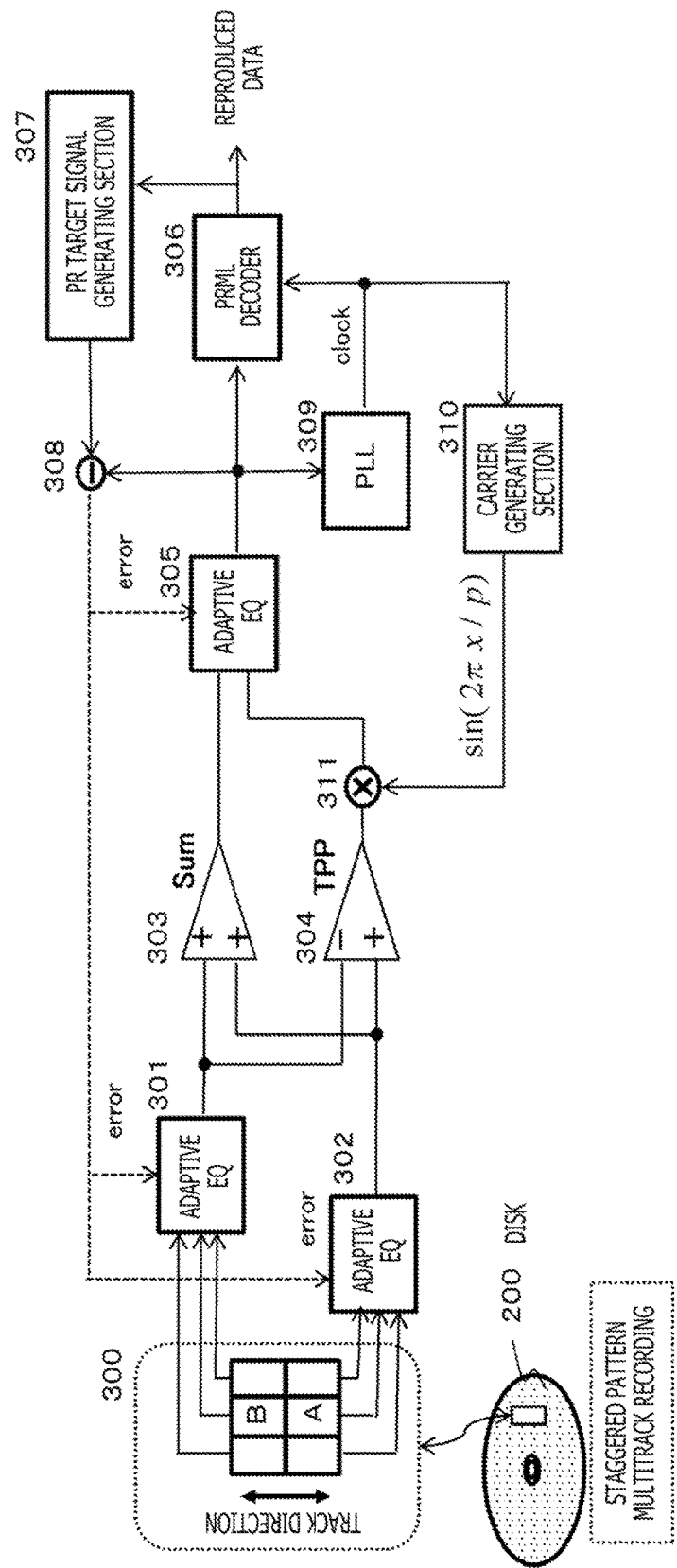
FIG. 20 is an explanatory diagram explaining a typical circuit configuration for executing reproduction of data from the disk.

FIG. 20 depicts a typical circuit configuration for executing reproduction of data from a disk that stores record data including the record signal with a frequency band higher than the cut-off frequency.

Specifically, the drawing depicts a typical configuration of a reproduction circuit that reproduces, from the disk formed with staggered pattern carrier grooves explained above with reference to Subfigure (A) in FIG. 17 and FIG. 19, the (1, 7) RLL-pp signal of which the high frequencies were cut off as explained above with reference to FIGS. 14 to 16, for example.

The data reproduction process using the circuit configuration depicted in FIG. 20 is explained below.

A disk 200 stores data including the record signal with a frequency band higher than the cut-off frequency. Specifically, this is a disk which has staggered pattern carrier grooves formed thereon and which stores, for example, the above-mentioned (1, 7) RLL-pp signal of which the high frequency range was cut off.

A photo-detecting section 300 has two split detectors as explained above with reference to FIGS. 1 and 6, among others.

It is to be noted that reflected light is received not only from one read target track but also from two adjacent tracks on both sides thereof.

In the drawing, rectangles A and B constitute a light-receiving region that receives reflected light from the read target center track. Rectangles on both sides of the rectangles A and B make up a light-receiving region that receives reflected light from the adjacent tracks.

In order to extract a detection signal detected by the detector B from the reflected light off the read target track, an adaptive equalizer 301 performs the process of removing noise signals which are incident on the photo-detecting section 300 and which come from adjacent tracks.

Specifically, the signals from the read track and from two adjacent tracks are input to adaptive equalizer filters that perform an adaptive equalization process in reference to an ideal signal of the read target track. The process permits acquisition of the signal from the read target track.

The ideal signal of the read target track is output from a PR target signal generating section 307.

The output of the adaptive equalizer 301 constitutes a signal B from the read target track.

Meanwhile, an adaptive equalizer 302 also performs the process of removing noise signals which are incident on the photo-detecting section 300 and which come from the adjacent tracks in order to extract a detection signal detected by the detector A from the reflected light off the read target track.

The specific process involved is similarly to that carried out by the adaptive equalizer 301. The signals from the read track and from the two adjacent tracks are input to adaptive equalizer filters that perform an adaptive equalization process in reference to an ideal signal of the read target track. The process permits acquisition of the signal from the read target track.

The ideal signal of the read target track is output from the PR target signal generating section 307.

The output of the adaptive equalizer 302 constitutes a signal A from the read target track.

The signals A and B correspond to the signals (A, B) output from the optical pickup explained above with reference to FIGS. 1 and 6.

The output signals (A, B) of the adaptive equalizers 301 and 302 are input to a sum signal generating section (Sum) 303 and to a differential signal generating section (TTP) 304.

The sum signal generating section (Sum) 303 generates a sum signal (A+B) of the output signals (A, B) from the adaptive equalizers 301 and 302.

On the other hand, the differential signal generating section (TPP) 304 generates a differential signal (A–B) of the output signals (A, from the adaptive equalizers 301 and 302.

The sum signal (A+B) generated by the sum signal generating section (Sum) 303 is input to an adaptive equalizer 305.

Meanwhile, the differential signal generated by the differential signal generating section (TPP) 304 is input to a multiplier 311.

The multiplier 311 performs the process of multiplying the differential signal (A–B) with the carrier signal [Sin(2 πx/p)] generated by a carrier generating section 310.

This process corresponds to the process of generating the TPP (after being shifted) in. Subfigure (2) in FIG. 16 from the TPP signal in Subfigure (1) in FIG. 16 explained above with reference to FIG. 16.

That is, the process is equivalent to bringing back to the initial frequency band the signal which is included in the TPP signal and which was frequency-shifted through multiplication of the carrier grooves with the recorded mark signal.

The adaptive equalizer 305 receives input of the sum signal (A+B) generated by the sum signal generating section (Sum) 303 and the frequency-shifted TPP signal generated by the multiplier 311, as well as a target signal generated by a PRML (Partial Response Maximum Likelihood) decoder 306 and the PR target signal generating section 307. Based on these inputs, the adaptive equalizer 305 performs the process of removing noise components and outputs the resulting generated signal to the PRML decoder 306, to a PLL 309, and to a subtractor 308.

The PRML decoder 306 receives input of the sum signal (A+B) from the adaptive equalizer 305 and the frequency-shifted TPP signal. Given the inputs, the PRML decoder 306 generates the reproduced signal of maximum likelihood by the maximum likelihood decoding method.

Specifically, the Viterbi decoding method is applied, for example. Viterbi decoding involves achieving maximum likelihood decoding of a convolutional code by repeating the simple processes of addition, comparison, and selection, followed by a trace-back operation for ultimate data decoding. With Viterbi decoding, every time coded data (received data sequence) corresponding to one information bit is obtained, the intersignal intervals (metric) of paths in diverse states at that point are calculated to find out the path of maximum likelihood.

This decoding process causes the reproduced signal to be output.

The reproduced signal includes frequency components ranging from low-frequency components lower than the cut-off frequency to high-frequency components higher than the cut-off frequency, as explained above with reference to Subfigure (4) in FIG. 16, for example.

It is to be noted that the PRML decoder 306 receives input of a clock signal from the PLL 309 that generates the clock signal based on the output from the adaptive equalizer 305. Under control of the clock signal, the PRML decoder 306 generates and outputs the reproduced signal.

The PLL 309 performs the process of generating the clock signal in accordance with a servo signal included in the output from the adaptive equalizer 305.

The clock signal generated by the PLL 309 is also input to the carrier generating section 310. On the basis of the clock signal, the carrier generating section 310 outputs the carries signal [Sin(2 πx/p)] to the multiplier 311 in time with reproduction of data from the recorded data area other than the servo area.

Only when the record signal is reproduced from the recorded data area other than the servo area, does the multiplier 311 perform selectively the process of multiplication with the carrier signal [Sin(2 πx/p)].

The reproduced signal generated by the PRML decoder 306 is also input to the PR target generating section 307.

Based on the reproduced signal generated by the PRML decoder 306, the PR target generating section 307 generates a target signal of the subsequent reproduced signal and inputs the generated target signal to the subtractor 308.

The subtractor calculates the difference between the target signal and the generated signal from the adaptive equalizer 305. The subtractor then feeds the difference regarding the target (error amount) back to the adaptive equalizers 301, 302, and 205.

The adaptive equalizers 301, 302, and 305 receive input of the difference (error amount) and carry out an adaptive equalization process to generate an output signal.

It is to be noted that the reproduction process in accordance with the circuit configuration depicted in FIG. 20 may be carried out, for example, under control of a reproduction processing program stored in a storage section of the reproduction apparatus (information processing apparatus).

Figure 21:
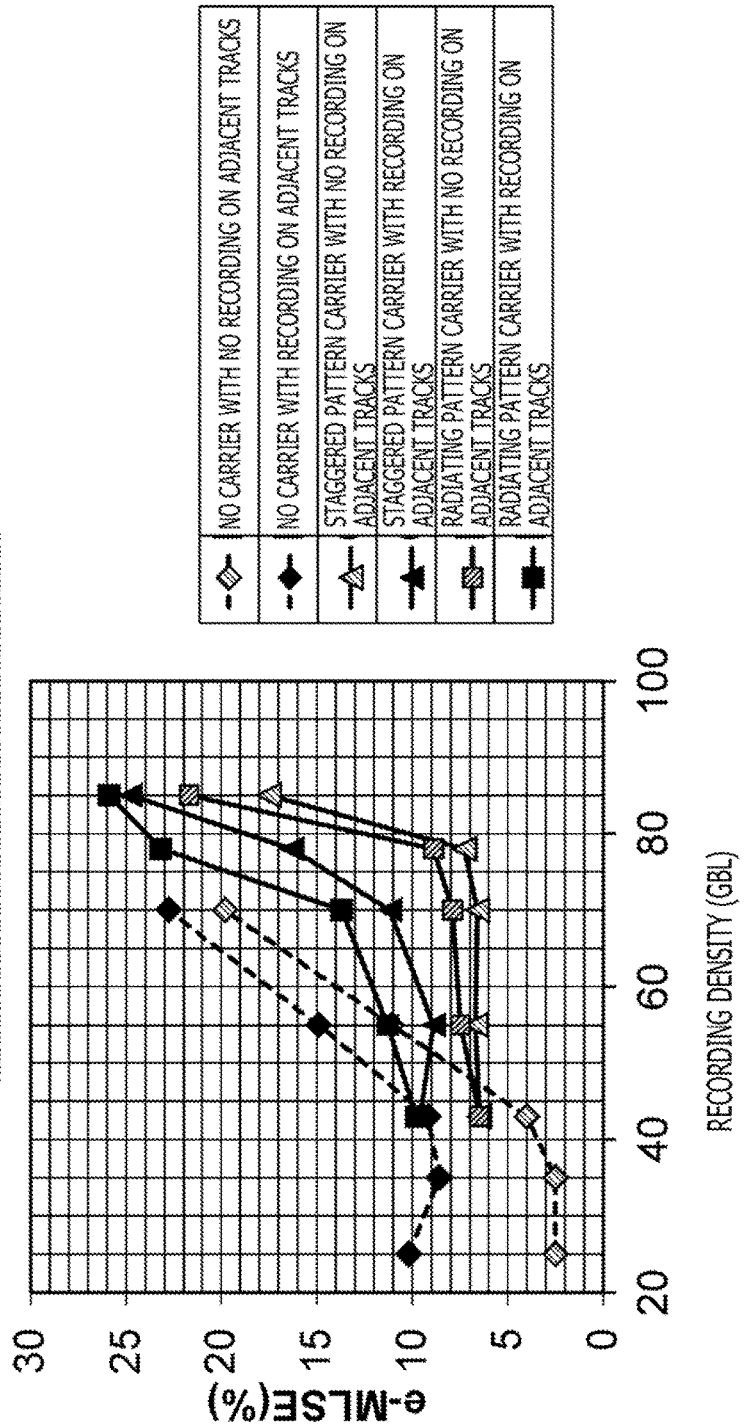
FIG. 21 is an explanatory diagram explaining the evaluation results of reproduced signals from disks having different carrier structures.

FIG. 21 depicts the results of evaluation of reproduced signals according to the types of carrier grooves formed on the disks.

The graph in FIG. 21 depicts evaluation values with regard to data reproduction from the following six disk types:

(a) a disk with no carrier and with no recorded data on adjacent tracks;

(b) a disk with no carrier and with recorded data on adjacent tracks;

(c) a disk with a staggered pattern carrier and with no recorded data on adjacent tracks;

(d) a disk with a staggered pattern carrier and with recorded data on adjacent tracks;

(e) a disk with a radiating pattern carrier and with no recorded data on adjacent tracks; and (f) a disk with a radiating pattern carrier and with recorded data on adjacent tracks.

In the graph depicted in FIG. 21, the horizontal axis denotes data recoding density (GBL: gigabyte linear density) on the disks, and the vertical axis represents e-MLSE (%) as the evaluation value for reproduced signals.

Note that the conditions for setting the record signal and the carrier on the disks are as follows:

Tp=0.225 μm

Carrier: in linear direction; carrier period =3T; depth of the protruding and recessed pattern =λ/8; no mark phase; amplitude =0.3

What follows is a description of e-MLSE used as the evaluation value for the reproduced signal.

The index i-MLSE has been known as the evaluation value for the reproduced signal. The MLSE (Maximum Likelihood Sequence Error) is the index representing the probability of error calculated using the difference between a target level established by use of Viterbi-detected data on the one hand, and the actual signal level on the other hand.

Calculating the index i-MLSE involves weighting a number of error-prone data patterns.

However, in a case where recording density is made significantly higher, there occur different error-prone data patterns. As a result, the error of the existing signal index i-MLSE becomes a problem. Hence the use of e-MLSE, another signal evaluation value which is different from i-MLSE and which addresses newly-added data patterns necessary for improving the accuracy of the signal index for higher linear density.

The index e-MLSE adopted as the reproduction evaluation value represents the probability of error included in the reproduced signal. That is, when the value of e-MLSE is smaller, that means a satisfactorily reproduced signal is acquired at lower error rates.

For example, if e-MLSE is 15% or lower in the graph of FIG. 21, the reproduced signal is considered satisfactory.

From the graph depicted in FIG. 21, the following conclusions are drawn:

(1) The disk formed with the carrier is associated with a smaller evaluation value (e-MLSE) than the disk with no carrier, and provides reproduced data of higher quality with fewer errors.

(2) The disk formed with the staggered pattern carrier is associated with a smaller evaluation value (e-MLSE) than the disk with the radiating patter carrier, and provides reproduced data of higher quality with fewer errors.

That is, in descending order of reproduced data quality, high quality to low quality, the high-density recording disks are ranked as follows:

(1) the disk with the staggered pattern carrier;
(2) the disk with the radiating pattern carrier; and
(3) the disk with no carrier.

6. Other Typical Reproduction Circuit Configurations

One specific circuit configuration of the reproduction apparatus for performing the process of reproducing data from the disk was explained above with reference to FIG. 20.

Besides the circuit depicted in FIG. 20, there are circuits of diverse configurations for carrying out the reproduction process.

Figure 22:
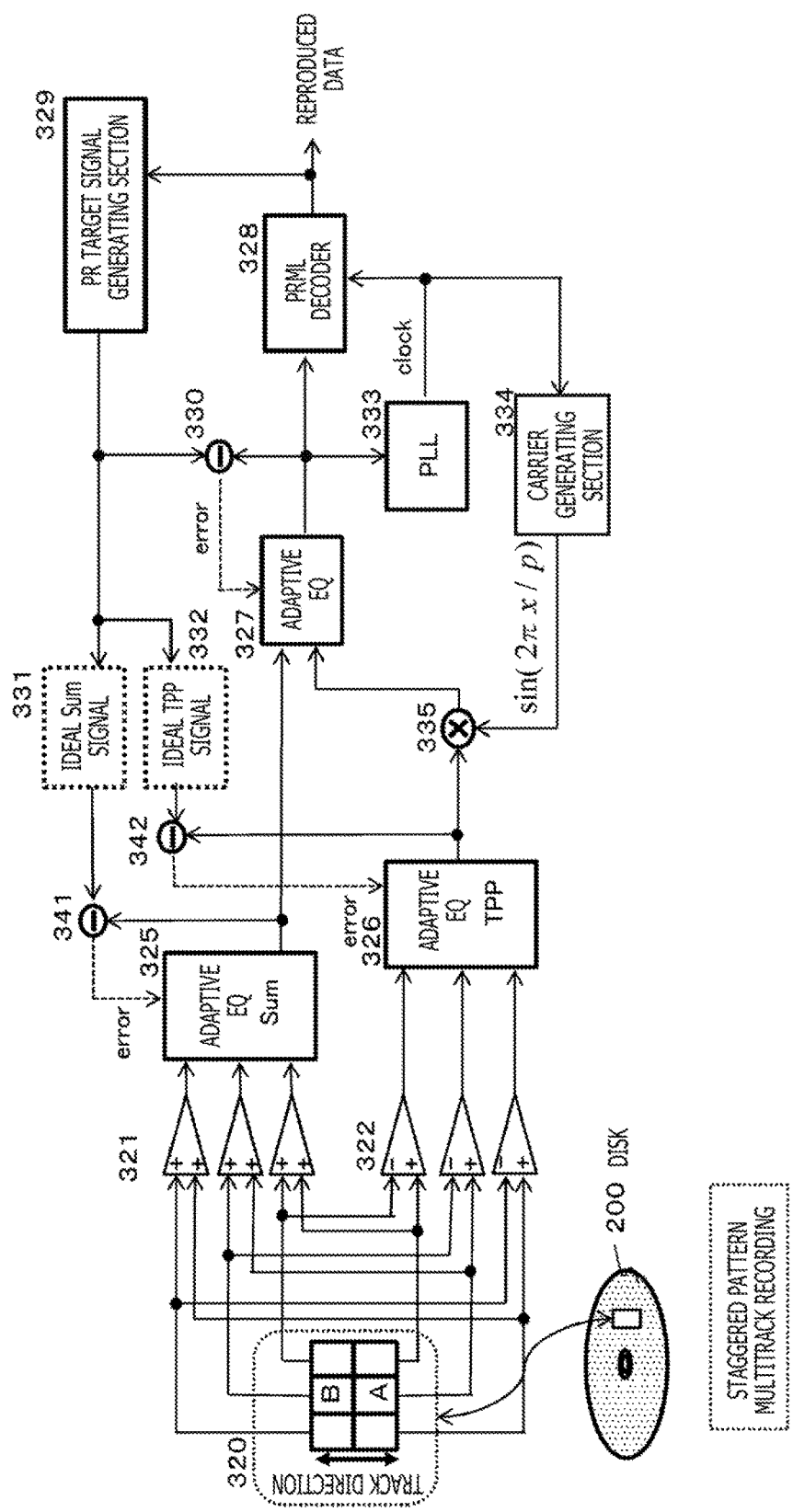
FIG. 22 is an explanatory diagram explaining a typical circuit configuration for executing reproduction of data from the disk.

The configuration depicted in FIG. 22 is another typical configuration of the reproduction circuit different from the configuration in FIG. 20.

The reproduction circuit depicted in FIG. 22, as with the circuit in FIG. 20, is configured to perform the process of reproducing data from the disk that stores data including the record signal with a frequency band higher than the cut-off frequency.

Specifically, this is another typical configuration of the reproduction circuit that reproduces the high-frequency-cut (1, 7) RLL-pp signal explained above with reference to FIGS. 14 to 16, the signal being recorded on the disk formed with staggered pattern carrier grooves discussed above with reference to Subfigure (1) in FIG. 17 and FIG. 19, for example.

The process of reproducing data using the circuit configuration depicted in FIG. 22 is explained below.

The disk 200 stores data including the record signal with a frequency band higher than the cut-off frequency. Specifically, this is a disk which has staggered pattern carrier grooves formed thereon and which stores, for example, the above-mentioned (1, 7) RLL-pp signal of which the high-frequency range was cut off.

A photo-detecting section 320 has two split detectors as explained above with reference to FIGS. 1 and 6, among others.

It is to be noted that reflected light is received not only from one read target track but also from two adjacent tracks on both sides thereof.

In the drawing, rectangles A and B constitute a light-receiving region that receives reflected light from the read target center track. Rectangles on both sides of the rectangles A and B make up a light-receiving region that receives reflected light from the adjacent tracks.

In the configuration of FIG. 22, detection signals detected by the detectors A and B from the read track and detection signals detected by the detectors A and B from the two adjacent tracks are input individually to sum signal calculating sections 321 and differential signal calculating sections 322.

The outputs from three sum signal calculating section 321 constitute the sum signal (A+B) of the detection signals detected by the detectors A and B from the read track, and a sum signal of the detection signals detected by the detectors A and B from the tracks adjacent to the read track. These outputs representing the three tracks are input to an adaptive equalizer (Sum) 325.

In order to extract the sum signal (A+B) from the read target track, the adaptive equalizer 325 performs the process of removing the sum signal which is incident on the photo-detecting section 300 and which corresponds to the adjacent tracks, i.e., the sum signal (An+Bn) made up of noise signals.

Specifically, the sum signal (A+B) from the read track and the noise sum signal (An+Bn) from the two adjacent tracks are input to adaptive equalizer filters that perform an adaptive equalization process in reference to an ideal signal of the read target track (ideal sum signal). The process permits acquisition of the sum signal (A+B) from the read target track.

An ideal sum signal 331, which is the ideal signal of the read target track, is output from a PR target signal generating section 329.

The output of the adaptive equalizer 325 constitutes the sum signal (A+B) from the read target track.

Meanwhile, in order to extract the differential signal (A−B) from the read target track, an adaptive equalizer 326 performs the process of removing the differential signal which is incident on the photo-detecting section 300 and which corresponds to the adjacent tracks, i.e., the differential signal (An−Ba) made up of noise signals.

Specifically, the differential signal (A−B) from the read track and the noise differential signal (An−Bn) from the two adjacent tracks are input to adaptive equalizer filters to perform an adaptive equalization process is reference to an ideal signal of the read target track (i.e., ideal TPP signal). This process permits acquisition of the differential signal (A−B) from the read target track.

An ideal TPP signal 332, which is the ideal signal of the read target track, is output from the PR target signal generating section 329.

The output of the adaptive equalizer 326 constitutes the differential signal (A−B) from the read target track.

The sum signal (A+B) generated by the adaptive equalizer 326 is input to an adaptive equalizer 327.

Meanwhile, the differential signal (A−B) generated by the adaptive equalizer 326 is input to a multiplier 335.

The multiplier 335 performs the process of multiplying the differential signal (A−B) with the carrier signal [$\sin(2\pi x/p)$] generated by a carrier generating section 334.

This process corresponds to the process of generating the TPP signal (after being shifted) in Subfigure (2) in FIG. 16 from the TPP signal in. Subfigure (1) in FIG. 16 explained above with reference to FIG. 16.

That is, this process is equivalent to bringing back to the initial frequency band the signal which is included in the TPP signal and which was frequency-shifted through multiplication of the carrier grooves with the recorded mark signal.

The adaptive equalizer 327 receives input of the sum signal (A+B) generated by the adaptive equalizer 325 and the frequency-shifted TPP signal generated by the multiplier 335, as well as a target signal generated by a PRML (Partial Response Maximum Likelihood) decoder 328 and the PR target signal generating section 329. Based on these inputs, the adaptive equalizer 327 performs the process of removing noise components and outputs the resulting generated signal to the PRML decoder 328, to a PLL 333, and to a subtractor 360.

The PRML decoder 328 receives input of the sum signal (A+B) from the adaptive equalizer 327 and the frequency-shifted TPP signal. Given the inputs, the PRML decoder 328 generates the reproduced signal of maximum likelihood by the maximum likelihood decoding method.

Specifically, the Viterbi decoding method is applied, for example. Viterbi decoding involves achieving maximum likelihood decoding of a convolutional code by repeating the simple processes of addition, comparison, and selection, followed by a trace-back operation for ultimate data decoding. With Viterbi decoding, every time coded data (received data sequence) corresponding' to one information bit is obtained, the intersignal intervals (metric) of paths in diverse states at that point are calculated to find out the path of maximum likelihood.

This decoding process causes the reproduced signal to be output.

The reproduced signal includes frequency components ranging from low-frequency components lower than the cut-off frequency to high-frequency components higher than the cut-off frequency, as explained above with reference to Subfigure (4) in FIG. 16, for example.

It is to be noted that the PRML decoder 328 receives input of a clock signal from the PLL 333 that generates the clock signal based on the output of the adaptive equalizer 327. Under control of the clock signal, the PRML, decoder 328 generates and outputs the reproduced signal.

The PLL 333 performs the process of generating the clock signal in accordance with a servo signal included in the output of the adaptive equalizer 327.

The clock signal generated by the PLL 333 is also input to the carrier generating section 334. On the basis of the clock signal, the carrier generating section 334 outputs the carrier signal [Sin (2 πx/p)] to the multiplier 311 in time with reproduction of data from the recorded data area other than the servo area.

Only when the record signal is reproduced from the recorded data area other than the servo area, does the multiplier 335 perform selectively the process of multiplication with the carrier signal [Sin(2 πx/p)].

The reproduced signal generated by the PRML decoder 328 is also input to the PR target generating section 329.

Based on the reproduced signal generated by the PRML decoder 328, the PR target generating section 329 generates a target signal of the subsequent reproduced signal.

The target signal includes the ideal sum signal 331 and the ideal TPP signal 332. The ideal sum signal 331 is input to a subtractor 341. The ideal TPP signal 332 is input to a subtractor 342. Further, an ideal reproduced signal including the ideal sum signal and the ideal TPP signal is input to a subtractor 330.

The subtractor 341 calculates the difference between the ideal sum signal 331 and the signal generated by the adaptive equalizer 325. The subtractor 341 then feeds the difference regarding the target (error amount) back to the adaptive equalizer 325.

The adaptive equalizer 325 receives input of the difference (error amount) and carries out an adaptive equalization process to generate and output an output signal (A+B).

The subtractor 342 calculates the difference between the ideal TPP signal 332 and the signal generated by the adaptive equalizer 326. The subtractor 342 then feeds the difference regarding the target (error amount) back to the adaptive equalizer 326.

The adaptive equalizer 326 receives input of the difference (error amount) and carries out an adaptive equalization process to generate and output an output signal (A−B).

The subtractor 330 calculates the difference between the ideal reproduced signal and the signal generated by the adaptive equalizer 327. The subtractor 330 then feeds the difference regarding the target (error amount) back to the adaptive equalizer 327.

The adaptive equalizer 327 receives input of the difference (error amount) and carries out an adaptive equalization process to generate and output a reproduced signal that constitutes the output signal.

In the circuit configuration depicted in FIG. 22, the sum signal and the differential signal are generated individually not only from the read track but also from the adjacent tracks. The adaptive equalization process is subsequently carried out to calculate the sum signal (A+B) and differential signal (A−B) regarding the read target track.

It is to be noted that the reproduction process in accordance with the circuit configuration depicted in FIG. 22 may be carried out, for example, under control of a reproduction processing program stored in a storage section of the reproduction apparatus (information processing apparatus).

Figure 23:
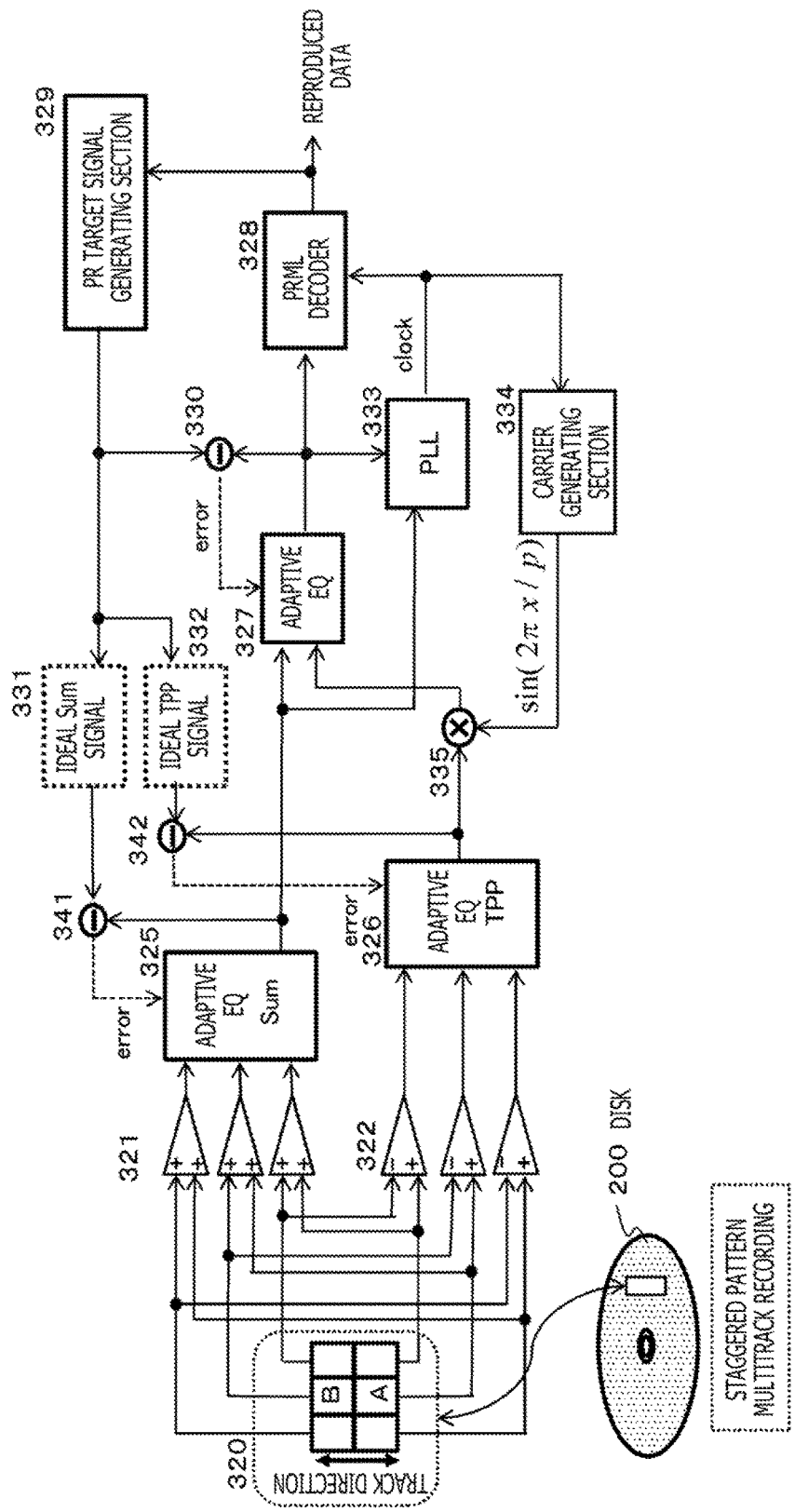
FIG. 23 is an explanatory diagram explaining another typical circuit configuration for executing reproduction of data from the disk.

Further, another typical configuration of the reproduction circuit is depicted in FIG. 23.

The circuit depicted in FIG. 23 is configured approximately the same as the circuit depicted in FIG. 22, except that the input to the PLL 333 that performs the process of clock generation is different from what is indicated in FIG. 22.

In the configuration of FIG. 22, the PLL 333 receives input of the output from the adaptive equalizer 327 that generates the reproduced signal including the sum signal (addition signal) and the TPP signal (differential signal).

In the configuration depicted in FIG. 23, by contrast, the PLL 333 receives input of the output from the adaptive equalizer 325 that generates and outputs the sum signal (addition signal (A+B)).

The PLL 333 is configured to generate the clock signal based on the record signal from the servo area recorded on the disk. The record signal from the servo area can be read using only the sum signal (addition signal (A+B)). That is, the high-frequency signal of which the frequencies exceed the cut-off frequency and which can be read using the TPP signal is not used.

As a result, the signal input to the PLL 333 is not the output from the adaptive equalizer 327 that generates the reproduced signal including the TPP signal but the output from the adaptive equalizer 325 that outputs only the sum signal (addition signal (A+B)). This still allows the PLL 333 to generate the clock signal correctly.

In the circuit depicted in. FIG. 23, only the input to the PLL 333 is different from the circuit in FIG. 22. The rest of the circuit configuration is the same as explained above with reference to FIG. 22.

It is to be noted that the reproduction process in accordance with the circuit configuration depicted in FIG. 23 may also be carried out, for example, under control of a reproduction processing program stored in a storage section of the reproduction apparatus (information processing apparatus).

7. Summary of the Structures According to the Present Disclosure

It is to be understood that while the present disclosure has been described in conjunction with a specific embodiment, it is evident that alternatives, modifications and variations will become obvious to those skilled in the art within the spirit and scope of this disclosure. That is, the present invention has been disclosed using only examples and should not be construed to be limited thereby but should be construed to include such aforementioned obvious variations and only be limited by the proper scope or fair meaning of the accompanying claims.

It is to be noted that the technology disclosed in this description may be structured preferably as follows:

(1) An information processing apparatus including:
a photo-detecting section configured to receive reflected light from a disk; and
a signal processing section configured to generate a reproduced signal by performing signal processing on a light reception signal from the photo-detecting section, in which
the photo-detecting section has two split detectors A and B in a direction of tracks on the disk,
the signal processing section generates a TPP (Tangential Push-pull) signal made of a differential signal derived from detection signals from the detectors A and B, and
the signal processing section generates the reproduced signal by extracting, from the TPP signal through calculation, a high-frequency component signal in a record signal recorded on the disk.

(2) The information processing apparatus as stated in paragraph (1) above, in which
the disk has the record signal recorded on a carrier signal formed by carrier grooves in a protruding and recessed pattern having a high frequency higher than or equal to a cut-off frequency, and
the signal processing section extracts the high-frequency component signal from the record signal recorded on the disk by performing an operation of frequency-shifting the TPP signal to a high-frequency component range in the record signal, the TPP signal being obtained as a readout signal by frequency-shifting a superimposed signal having the carrier signal and the record signal superimposed with each other.

(3) The information processing apparatus as stated in paragraph (2) above, in which
the operation is a process of multiplying the TPP signal with the carrier signal, and
the signal processing section performs the process of multiplying the TPP signal with the carrier signal in order to frequency-shift the TPP signal to the high-frequency component range in the record signal recorded on the disk.

(4) The information processing apparatus as stated in any one of paragraphs (1) to (3) above, in which
the signal processing section generates the reproduced signal by performing a process of combining a sum signal summing up the detection signals from the detectors A and B, with the TPP signal from which the component of the carrier signal is removed so as to correspond to the record signal.

(5) The information processing apparatus as stated in any one of paragraphs (1) to (4) above, in which,
on the basis of the sum signal, the signal processing section generates the reproduced signal primarily made of a frequency component lower than or equal to the cut-off frequency, and, on the basis of the TPP signal, the signal processing section generates the reproduced signal primarily made of a frequency component higher than or equal to the cut-off frequency.

(6) The information processing apparatus as stated in any one of paragraphs (1) to (5) above, in which
the disk is formed with carrier grooves in a protruding and recessed pattern having a high frequency higher than or equal to a cut-off frequency, and the protruding and recessed pattern making up the carrier grooves is arranged in a staggered manner between adjacent tracks.

(7) The information processing apparatus as stated in any one of paragraphs (1) to (5) above, in which
the disk is formed with carrier grooves in a protruding and recessed pattern having a high frequency higher than or equal to a cut-off frequency, and
the protruding and recessed pattern making up the carrier grooves is arranged in a radiating manner and aligned between adjacent tracks.

(8) The information processing apparatus as stated in any one of paragraphs (1) to (7) above, in which
the disk is structured to have a recording area having the record signal recorded therein and a servo area having a servo signal recorded therein, the recording area and the servo area being arranged alternately on the disk, and
the signal processing section generates a clock signal based on the servo signal to perform timing control over the process of generating the reproduced signal.

(9) The information processing apparatus as stated in any one of paragraphs (1) to (8) above, in which
the signal processing section has an adaptive equalizer for removing signals stemming from adjacent tracks from the light reception signal coming from the photo-detecting section.

(10) The information processing apparatus as stated in any one of paragraphs (1) to (9) above, in which
the signal processing section performs a maximum likelihood decoding process in accordance with a PRML (Partial Response Maximum Likelihood) method.

(11) An optical disk having a record signal recorded on a carrier signal on a disk made of carrier grooves in a protruding and recessed pattern having a high frequency higher than or equal to a cut-off frequency, in which
a reproduction apparatus is used to read a TPP (Tangential Push-pull) signal obtained by frequency-shifting a superimposed signal having the carrier signal and the record signal superimposed with each other, the reproduction apparatus being further used to extract a high-frequency component signal from the record signal recorded on the optical disk by performing an operation of frequency-shifting the TPP signal to a high-frequency component range in the record signal recorded on the optical disk.

(12) The optical disk as stated in paragraph (11) above, in which
the operation is a process of multiplying the TPP signal with the carrier signal,
the reproduction apparatus is used to perform the process of multiplying the TPP signal with the carrier signal in order to frequency-shift the TPP signal to the high-frequency component range in the record signal recorded on the disk, and the reproduction apparatus is further used to generate the reproduced signal by extracting the high-frequency component signal from the record signal recorded on the optical disk.

(13) The optical disk as stated in paragraph (11) or (12) above, in which the protruding and recessed pattern having a high frequency making up the carrier grooves is arranged in a staggered manner between adjacent tracks.

(14) The optical disk as stated in paragraph (11) or (12) above, in which the protruding and recessed pattern having a high frequency making up the carrier grooves is arranged in a radiating manner and aligned between adjacent tracks.

(15) The optical disk as stated in any one of paragraphs (11) to (14) above, in which the optical disk is structured to have a recording area having the record signal recorded therein and a servo area having a servo signal recorded therein, the recording area and the servo area being arranged alternately on the optical disk.

(16) An information processing method for execution by an information processing apparatus including
 a photo-detecting section configured to receive reflected light from a disk, and
 a signal processing section configured to generate a reproduced signal by performing signal processing on a light reception signal from the photo-detecting section,
the photo-detecting section having two split detectors A and B in a direction of tracks on the disk,
the information processing method including:
 causing the signal processing section to generate a TPP (Tangential Push-pull) signal made of a differential signal derived from detection signals from the detectors A and B; and
 causing the signal processing section to generate the reproduced signal by extracting, from the TPP signal through calculation, a high-frequency component signal in a record signal recorded on the disk.

(17) A program for causing an information processing apparatus to perform information processing, the information processing apparatus including
 a photo-detecting section configured to receive reflected light from a disk, and
 a signal processing section configured to generate a reproduced signal by performing signal processing on a light reception signal from the photo-detecting section,
the photo-detecting section having two split detectors A and B in a direction of tracks on the disk,
the program performing a procedure including:
 causing the signal processing section to generate a TPP (Tangential Push-pull) signal made of a differential signal derived from detection signals from the detectors A and B; and
 causing the signal processing section to generate the reproduced signal by extracting, from the TPP signal through calculation, a high-frequency component signal in a record signal recorded on the disk.

Further, the series of the processes described is the description may be executed by hardware, by software, or by the combination of both. Where the software-based processing is to be carried out, the programs constituting processing sequences may be either installed into an internal memory of a computer in dedicated hardware for program execution, or installed into a general-purpose computer capable of performing diverse processes for execution of the programs. The programs may be recorded beforehand on recording media, for example. The programs may be installed into the computer from such recording media or received through networks such as a LAN (Local Area Network) or the Internet before being installed onto internal recording media such as hard disks.

It is to be noted that the processes described is the description may be executed not only chronologically in the depicted sequence but also parallelly or individually as needed or in keeping with the performance of the apparatus doing the execution. Also, in this description, the term "system" refers to a group of logically configured devices. The devices in such a configuration may or may not be housed in a single enclosure.

INDUSTRIAL APPLICABILITY

According to the structures of one embodiment of the present disclosure, as described above, there is provided as optical disk from which high-density data is reproduced, as well as a reproduction apparatus that reproduces data from such an optical disk having high-density data recorded thereon.

Specifically, a photo-detecting section having two split detectors A and B in the track direction of the disk and a signal processing section are provided. The signal processing section generates a TPP (Tangential Push-pull) signal as a differential signal derived from detection signals of the detectors A and B. Using the TPP signal, the signal processing section extracts by calculation a high-frequency component signal from a record signal recorded on the disk to generate a reproduced signal. The disk is structured to have the record signal recorded on a carrier signal over the disk formed with a protruding and recessed pattern of high frequencies higher than or equal to a cut-off frequency. The signal processing section multiplies by the carrier signal the TPP signal read from the disk as a frequency-shifted signal having the carrier signal and the record signal superimposed thereon. In so doing, the signal processing section shifts the TPP signal to frequencies in the high-frequency range to extract the high-frequency component signal from the record signal on the disk.

These structures are used to implement an optical disk from which high-density data is reproduced as well as a reproduction apparatus that reproduces data from an optical disk having high-density data recorded thereon.

REFERENCE SIGNS LIST

10 Disk
11 Mark (low-reflectance portion.)
12 High-reflectance portion
20 Optical pickup
21 Laser beam outputting section
22 Photo-detecting section
23 Signal processing section
24 Sum signal generating section
100 Disk
110 Optical pickup
111 Laser beam outputting section
112 Photo-detecting section.
113 Signal processing section.
121 Sum signal generating section.

122 Gain controlling section
131 Differential signal generating section
132 Multiplier
133 Gain controlling section.
141 Composite signal generating section
200 Disk
300 Photo-detecting section.
301 Adaptive equalizer
302 Adaptive equalizer
303 Sum signal generating section
304 Differential signal generating section
305 Adaptive equalizer
306 PRML decoder
307 PR target signal generating section
308 Subtractor
309 PLL
310 Carrier generating section
311 Multiplier
320 Photo-detecting section
321 Sum signal generating section
322 Differential signal generating section
325 Adaptive equalizer
326 Adaptive equalizer
327 Adaptive equalizer
328 PRML decoder
329 PR target signal generating section
330 Subtractor
331 Ideal sum signal
332 Ideal TPP signal
333 PLL
334 Carrier generating section
335 Multiplier
341 Subtractor
342 Subtractor

The invention claimed is:

1. An information processing apparatus comprising:
a photo-detecting section configured to receive reflected light from a disk; and
a signal processing section configured to generate a reproduced signal by performing signal processing on a light reception signal from the photo-detecting section, wherein
the disk is structured to have a record signal recorded on a carrier signal formed by carrier grooves in a protruding and recessed pattern having a high frequency higher than or equal to a cut-off frequency,
the photo-detecting section has two split detectors A and B in a direction of tracks on the disk,
the signal processing section generates a TPP (Tangential Push-pull) signal made of a differential signal derived from detection signals from the detectors A and B, the TPP signal being obtained as a readout signal by frequency-shifting a superimposed signal having the carrier signal and the record signal superimposed with each other, and
the signal processing section generates the reproduced signal through extraction of a high-frequency component range from the record signal recorded on the disk by performing an operation of frequency-shifting the generated TPP signal to the high-frequency component range in the record signal recorded on the disk.

2. The information processing apparatus according to claim 1, wherein
the operation is a process of multiplying the TPP signal with the carrier signal, and
the signal processing section performs the process of multiplying the TPP signal with the carrier signal in order to frequency-shift the TPP signal to the high-frequency component range in the record signal recorded on the disk.

3. The information processing apparatus according to claim 1, wherein
the signal processing section generates the reproduced signal by performing a process of combining a sum signal summing up the detection signals from the detectors A and B, with the TPP signal from which the component of the carrier signal is removed so as to correspond to the record signal.

4. The information processing apparatus according to claim 1, wherein,
on the basis of the sum signal, the signal processing section generates the reproduced signal primarily made of a frequency component lower than or equal to the cut-off frequency, and,
on the basis of the TPP signal, the signal processing section generates the reproduced signal primarily made of a frequency component higher than or equal to the cut-off frequency.

5. The information processing apparatus according to claim 1, wherein
the disk is formed with carrier grooves in a protruding and recessed pattern having a high frequency higher than or equal to a cut-off frequency, and
the protruding and recessed pattern making up the carrier grooves is arranged in a staggered manner between adjacent tracks.

6. The information processing apparatus according to claim 1, wherein
the disk is formed with carrier grooves in a protruding and recessed pattern having a high frequency higher than or equal to a cut-off frequency, and
the protruding and recessed pattern making up the carrier grooves is arranged in a radiating manner and aligned between adjacent tracks.

7. The information processing apparatus according to claim 1, wherein
the disk is structured to have a recording area having the record signal recorded therein and a servo area having a servo signal recorded therein, the recording area and the servo area being arranged alternately on the disk, and
the signal processing section generates a clock signal based on the servo signal to perform timing control over the process of generating the reproduced signal.

8. The information processing apparatus according to claim 1, wherein
the signal processing section has an adaptive equalizer for removing signals stemming from adjacent tracks from the light reception signal coming from the photo-detecting section.

9. The information processing apparatus according to claim 1, wherein
the signal processing section performs a maximum likelihood decoding process in accordance with a PRML (Partial Response Maximum Likelihood) method.

10. An optical disk having a record signal recorded on a carrier signal on a disk made of carrier grooves in a protruding and recessed pattern having a high frequency higher than or equal to a cut-off frequency, wherein
a reproduction apparatus is used to read a TPP (Tangential Push-pull) signal obtained by frequency-shifting a superimposed signal having the carrier signal and the record signal superimposed with each other, the reproduction apparatus being further used to extract a high-frequency component signal from the record signal recorded on the optical disk by performing an operation of frequency-shifting the TPP signal to a high-frequency component range in the record signal recorded on the optical disk, wherein the operation is a process of multiplying the TPP signal with the carrier signal, the reproduction apparatus is used to perform the process of multiplying the TPP signal with the carrier signal in order to frequency-shift the TPP signal to the high-frequency component range in the record signal recorded on the disk, and the reproduction apparatus is further used to generate the reproduced signal by extracting the high-frequency component signal from the record signal recorded on the optical disk.

11. The optical disk according to claim 10, wherein the protruding and recessed pattern having a high frequency making up the carrier grooves is arranged in a staggered manner between adjacent tracks.

12. The optical disk according to claim 10, wherein the protruding and recessed pattern having a high frequency making up the carrier grooves is arranged in a radiating manner and aligned between adjacent tracks.

13. The optical disk according to claim 10, wherein the optical disk is structured to have a recording area having the record signal recorded therein and a servo area having a servo signal recorded therein, the recording area and the servo area being arranged alternately on the optical disk.

14. An information processing method for execution by an information processing apparatus including a photo-detecting section configured to receive reflected light from a disk, and a signal processing section configured to generate a reproduced signal by performing signal processing on a light reception signal from the photo-detecting section, the disk being structured to have a record signal recorded on a carrier signal formed by carrier grooves in a protruding and recessed pattern having a high frequency higher than or equal to a cut-off frequency, the photo-detecting section having two split detectors A and B in a direction of tracks on the disk, the information processing method comprising:

causing the signal processing section to generate a TPP (Tangential Push-pull) signal made of a differential signal derived from detection signals from the detectors A and B, the TPP signal being obtained as a readout signal by frequency-shifting a superimposed signal having the carrier signal and the record signal superimposed with each other; and causing the signal processing section to generate the reproduced signal through extraction of a high-frequency component range from the record signal recorded on the disk by performing an operation of frequency-shifting the generated TPP signal to the high-frequency component range in the record signal recorded on the disk.

15. A non-transitory computer-readable medium having embodied thereon a program, which when executed by at least one processor of an information processing apparatus including a photo-detecting section configured to receive reflected light from a disk, and a signal processing section configured to generate a reproduced signal by performing signal processing on a light reception signal from the photo-detecting section, the disk being structured to have a record signal recorded on a carrier signal formed by carrier grooves in a protruding and recessed pattern having a high frequency higher than or equal to a cut-off frequency, the photo-detecting section having two split detectors A and B in a direction of tracks on the disk, causes the information processing apparatus to execute an information processing method comprising:

causing the signal processing section to generate a TPP (Tangential Push-pull) signal made of a differential signal derived from detection signals from the detectors A and B, the TPP signal being obtained as a readout signal by frequency-shifting a superimposed signal having the carrier signal and the record signal superimposed with each other; and causing the signal processing section to generate the reproduced signal through extraction of a high-frequency component range from the record signal recorded on the disk by performing an operation of frequency-shifting the generated TPP signal to the high-frequency component range in the record signal recorded on the disk.

* * * * *